US012428974B2

(12) United States Patent
Molnar, Jr. et al.

(10) Patent No.: US 12,428,974 B2
(45) Date of Patent: Sep. 30, 2025

(54) SEGMENTED VARIABLE FAN OUTLET GUIDE VANE WITH UNIQUE ACTUATION MECHANISMS

(71) Applicant: Rolls-Royce North American Technologies Inc., Indianapolis, IN (US)

(72) Inventors: Daniel E. Molnar, Jr., Indianapolis, IN (US); Robert W. Heeter, Indianapolis, IN (US); Gregory J. Hebert, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/600,596

(22) Filed: Mar. 8, 2024

(65) Prior Publication Data

US 2024/0309772 A1 Sep. 19, 2024

Related U.S. Application Data

(60) Provisional application No. 63/452,853, filed on Mar. 17, 2023.

(51) Int. Cl.
*F01D 17/16* (2006.01)

(52) U.S. Cl.
CPC ........ *F01D 17/162* (2013.01); *F05D 2220/36* (2013.01); *F05D 2240/121* (2013.01)

(58) Field of Classification Search
CPC .... F01D 17/16; F01D 17/162; F05D 2220/36; F05D 2240/121; F02C 7/057; F02C 9/20
See application file for complete search history.

(56) References Cited

U.S. PATENT DOCUMENTS

| | | | |
|---|---|---|---|
| 3,237,918 | A | 3/1966 | Le et al. |
| 3,397,836 | A | 8/1968 | Badger et al. |
| 3,632,224 | A | 1/1972 | Wright et al. |
| 3,887,297 | A | 6/1975 | Welchek |
| 4,053,256 | A | 10/1977 | Hertel |
| 4,705,452 | A | 11/1987 | Karadimas |
| 4,791,783 | A | 12/1988 | Neitzel |
| 4,832,568 | A | 5/1989 | Roth et al. |
| 4,995,786 | A | 2/1991 | Wheeler et al. |
| 5,074,752 | A | 12/1991 | Murphy et al. |

(Continued)

FOREIGN PATENT DOCUMENTS

| | | |
|---|---|---|
| EP | 2659112 | 10/2020 |
| GB | 893054 | 4/1962 |

*Primary Examiner* — Steven M Sutherland

(74) *Attorney, Agent, or Firm* — Barnes & Thornburg

(57) ABSTRACT

A fan assembly for a gas turbine engine includes a fan duct, a fan, and an outlet guide vane assembly located in the fan duct axially downstream of the fan. The outlet guide vane assembly includes a first variable leading edge outlet guide vane that extends radially relative to the central axis and includes a leading edge portion and a fixed aft portion, the leading edge portion including a tip segment configured to rotate about a leading edge pitch axis and a hub segment located radially inward of and separate from the tip segment, the hub segment configured to independently rotate about the leading edge pitch axis relative to the tip segment. The assembly further includes two unique actuation assemblies each configured to rotate one of the tip and hub segments.

20 Claims, 34 Drawing Sheets

(56) References Cited

U.S. PATENT DOCUMENTS 5,259,187 A 11/1993 Dunbar et al.
5,314,301 A * 5/1994 Knight .................. F01D 17/162 415/161
5,494,404 A 2/1996 Furseth et al.
6,179,559 B1 1/2001 Weaver
6,283,705 B1 9/2001 Rice et al.
6,371,725 B1 4/2002 Manteiga et al.
6,619,916 B1 9/2003 Capozzi et al.
7,114,911 B2 10/2006 Martin et al.
7,118,331 B2 10/2006 Shahpar
7,444,802 B2 11/2008 Parry
7,722,321 B2 5/2010 Lhoest et al.
7,730,714 B2 6/2010 Wood et al.
7,942,632 B2 5/2011 Lord et al.
7,959,408 B2 6/2011 Belmonte
8,066,474 B1 11/2011 Jansen et al.
8,333,546 B2 12/2012 Colotte et al.
8,347,633 B2 * 1/2013 Smith ................... F01D 17/162 60/771
8,469,662 B2 6/2013 Lebrun et al.
8,641,367 B2 2/2014 Norris et al.
8,727,697 B2 5/2014 Eifert
8,915,703 B2 12/2014 Mohammed
9,091,174 B2 7/2015 Bagnall
9,103,228 B2 8/2015 Waugh et al.
9,157,366 B2 10/2015 Bernard
9,303,520 B2 4/2016 Hasting et al.
9,303,531 B2 4/2016 Hasting et al.
9,506,361 B2 11/2016 Fielding et al.
9,617,868 B2 4/2017 Bloxham et al.
9,885,291 B2 2/2018 Lecordix et al.
9,957,823 B2 5/2018 Epstein
10,100,663 B2 10/2018 Longworth et al.
10,247,018 B2 4/2019 Topol et al.
10,259,565 B2 4/2019 Ramakrishnan et al.
10,288,079 B2 5/2019 Skertic
10,458,261 B2 10/2019 Got et al.
10,495,108 B2 12/2019 Conner et al.
10,508,660 B2 12/2019 Hall et al.
10,527,060 B2 1/2020 Reynolds et al.
10,563,593 B2 2/2020 McNeil et al.
10,711,626 B2 7/2020 Humhauser et al.
10,737,801 B2 8/2020 Sands et al.
10,738,627 B2 8/2020 Gallagher et al.
10,794,281 B2 10/2020 Nestico et al.
10,815,802 B2 10/2020 Prasad
10,907,489 B2 2/2021 Papin et al.
11,131,323 B2 9/2021 Suciu et al.
11,384,656 B1 7/2022 Knechtel et al.
11,542,864 B2 1/2023 Bryan
2005/0147492 A1 7/2005 Mahoney et al.
2007/0119150 A1 5/2007 Wood et al.
2009/0297334 A1 12/2009 Norris et al.
2010/0014977 A1 1/2010 Shattuck
2011/0167792 A1 7/2011 Johnson et al.
2012/0163960 A1 6/2012 Ress et al.
2013/0276425 A1 10/2013 Rittenhouse
2013/0319009 A1 12/2013 Parente
2015/0361819 A1 * 12/2015 Epstein ................... F01D 1/023 415/208.1
2016/0333729 A1 11/2016 Miller et al.
2017/0058831 A1 3/2017 Bryan et al.
2017/0218842 A1 8/2017 Nestico et al.
2020/0088108 A1 3/2020 Klein et al.

* cited by examiner

SEGMENTED VARIABLE FAN OUTLET GUIDE VANE WITH UNIQUE ACTUATION MECHANISMS

CROSS-REFERENCE TO RELATED APPLICATIONS

This application claims the benefit under 35 U.S.C. § 119(e) of U.S. Provisional Application Ser. No. 63/452,853, filed on Mar. 17, 2023, the entire disclosure of which is incorporated herein by reference.

STATEMENT REGARDING FEDERALLY SPONSORED RESEARCH OR DEVELOPMENT

Embodiments of the present disclosure were made with government support under Contract No. FA8650-19-F-2078 awarded by the U.S. Air Force. The government may have certain rights.

FIELD OF THE DISCLOSURE

The present disclosure relates generally to gas turbine engines, and more specifically to fan assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a fan positioned within an inlet duct of the gas turbine engine. The fan includes rotating blades that that force air into the compressor section of the engine, as well as potentially providing additional thrust via forcing air around the engine core through bypass ducts. The fan blades may experience various operability issues due to factors such as variations in the intake airflow and pressure fluctuations within the inlet and the bypass ducts.

SUMMARY

The present disclosure may comprise one or more of the following features and combinations thereof.

A fan assembly for a gas turbine engine according to the present disclosure includes a fan duct arranged circumferentially around a central axis, a fan comprising a plurality of fan blades that extend radially outward relative to the central axis and that are adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air.

The outlet guide vane assembly includes a first variable leading edge outlet guide vane that extends radially relative to the central axis and includes a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly arranged radially outward of the leading edge portion and including a first actuation head coupled to the first tip segment and a first actuation arm coupled to the first actuation head, wherein rotation of the first actuation arm causes rotation of the first actuation head which causes rotation of first tip segment so as to selectively rotate the first tip segment about the leading edge pitch axis to a first pitch angle relative to the incoming fan exit air, and a second actuation assembly arranged radially inward of the leading edge portion and including a second actuation head coupled to the first hub segment and a second actuation arm coupled to the second actuation head, wherein rotation of the second actuation arm causes rotation of the second actuation head which causes rotation of first hub segment so as to selectively rotate the first hub segment independent of the first tip segment about the leading edge pitch axis to a second pitch angle relative to the incoming fan exit air.

In some embodiments, the first actuation assembly is configured to rotate the first tip segment to the first pitch angle and the second actuation assembly is configured to rotate the first hub segment to the second pitch angle which is different than the first pitch angle.

In some embodiments, the first hub segment includes a hinge rod extending radially outwardly from a radially outer side of the first hub segment and the first tip segment includes a hinge rod receiving cavity configured to securely receive the hinge rod.

In some embodiments, the hinge rod of the first hub segment and the hinge rod receiving cavity of the first tip segment are each cylindrical and aligned with the leading edge pitch axis.

In some embodiments, the first actuation head is coupled to a radially outer side of the first tip segment and is aligned with the leading edge pitch axis such that rotation of the first actuation head rotates the first tip segment about the leading edge pitch axis, and the second actuation head is coupled to a radially inner side of the first hub segment and is aligned with the leading edge pitch axis such that rotation of the second actuation head rotates the first hub segment about the leading edge pitch axis.

In some embodiments, the first actuation arm is fixedly coupled to the first actuation head at a first end of the first actuation arm and extends axially away from the first actuation head, a second end of the first actuation arm opposite the first end is configured to be moved generally circumferentially relative to the first actuation head such that the first actuation arm is configured to be pivoted about the leading edge pitch axis along with the first actuation head, and the second actuation arm is fixedly coupled to the second actuation head at a first end of the second actuation arm and extends axially away from the second actuation head, a second end of the second actuation arm opposite the first end is configured to be moved generally circumferentially relative to the second actuation head such that the second actuation arm is configured to be pivoted about the leading edge pitch axis along with the second actuation head.

In some embodiments, the outlet guide vane assembly further includes a first annular ring extending circumferentially about the central axis, and a second annular ring arranged radially inward of the first annular ring and extending circumferentially about the central axis. The second end of the first actuation arm is connected to the first annular ring, the second end of the second actuation arm is connected to the second annular ring, and circumferential movement of the first and second annular rings causes movement of the first and second actuation arms generally circumferentially relative to the first and second actuation heads, respectively.

In some embodiments, the outlet guide vane assembly further includes a plurality of variable leading edge outlet guide vanes that include the first variable leading edge outlet guide vane, each variable leading edge outlet guide vane of the plurality of variable leading edge outlet guide vanes including a respective tip segment and hub segment, and the tip and hub segment of each variable leading edge outlet guide vane of the plurality of variable leading edge outlet guide vanes is connected to the first and second annular rings via a respective actuation arm, respectively, such that movement of the first and second annular rings causes movement of the respective actuation arms generally circumferentially which causes the respective actuation arms to pivot about the rotation axes of the respective actuation heads such that the tip and hub segments of each variable leading edge outlet guide vane of the plurality of variable leading edge outlet guide vanes are rotated about respective leading edge axes.

In some embodiments, the outlet guide vane assembly further includes a first annular ring segment extending partially circumferentially about the central axis, and a second annular ring segment arranged radially inward of the first annular ring segment and extending partially circumferentially about the central axis. The second end of the first actuation arm is connected to the first annular ring segment, the second end of the second actuation arm is connected to the second annular ring segment, and circumferential movement of the first and second annular ring segments causes movement of the first and second actuation arms generally circumferentially relative to the first and second actuation heads, respectively.

In some embodiments, the outlet guide vane assembly further includes a third annular ring segment radially aligned with the first annular ring segment, extending partially circumferentially about the central axis, and circumferentially offset from the first annular ring segment, and a fourth annular ring segment radially aligned with the second annular ring segment, arranged radially inward of the first and second annular ring segments, extending partially circumferentially about the central axis, and circumferentially offset from the second annular ring segment.

The outlet guide vane assembly further includes a plurality of variable leading edge outlet guide vanes that include the first variable leading edge outlet guide vane, each variable leading edge outlet guide vane of the plurality of variable leading edge outlet guide vanes including a respective tip segment and hub segment, a first group of the tip and hub segments of the variable leading edge outlet guide vanes are connected to the first and second annular ring segments via a respective actuation arm, respectively. A second group of the tip and hub segments of the variable leading edge outlet guide vanes different from the first group are connected to the third and fourth annular ring segments via a respective actuation arm, respectively, and movement of the first and second annular ring segments causes movement of the respective actuation arms of the first group of tip and hub segments generally circumferentially such that the first group of tip and hub segments of each of the variable leading edge outlet guide vanes are rotated about respective leading edge axes. Movement of the third and fourth annular ring segments causes movement of the respective actuation arms of the second group of tip and hub segments generally circumferentially which causes the respective actuation arms to pivot about the rotation axes of the respective actuation heads such that the second group of tip and hub segments of each of the variable leading edge outlet guide vanes are rotated about respective leading edge axes.

In some embodiments, the first variable leading edge outlet guide vane further includes a central portion arranged between the first tip segment and the first hub segment such that the first tip segment and the first hub segment are radially spaced apart.

In some embodiments, the central portion is coupled to and extends axially away from an axially forward side of the fixed aft portion.

According to a further aspect of the present disclosure, a fan assembly for a gas turbine engine includes a fan duct arranged circumferentially around a central axis, a fan adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air.

The outlet guide vane assembly includes a first variable leading edge outlet guide vane including a leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly arranged radially outward of the leading edge portion and configured to selectively rotate the first tip segment about the leading edge pitch axis to a first pitch angle relative to the incoming fan exit air, and a second actuation assembly arranged radially inward of the leading edge portion and configured to selectively rotate the first hub segment independent of the first tip segment about the leading edge pitch axis to a second pitch angle relative to the incoming fan exit air.

In some embodiments, the first pitch angle is different than the second pitch angle.

In some embodiments, the first hub segment includes a hinge rod extending radially outwardly from a radially outer side of the first hub segment and the first tip segment includes a hinge rod receiving cavity configured to securely receive the hinge rod.

In some embodiments, the hinge rod of the first hub segment and the hinge rod receiving cavity of the first tip segment are each cylindrical and aligned with the leading edge pitch axis.

In some embodiments, the first actuation assembly includes a first actuation head coupled to the first tip segment and a first actuation arm coupled to the first actuation head, rotation of the first actuation arm causes rotation of the first actuation head which causes rotation of first tip segment, the second actuation assembly includes a second actuation head coupled to the first hub segment and a second actuation arm coupled to the second actuation head, and rotation of the second actuation arm causes rotation of the second actuation head which causes rotation of first hub segment.

In some embodiments, the first actuation head is coupled to a radially outer side of the first tip segment and is aligned with the leading edge pitch axis such that rotation of the first actuation head rotates the first tip segment about the leading edge pitch axis, and the second actuation head is coupled to a radially inner side of the first hub segment and is aligned with the leading edge pitch axis such that rotation of the second actuation head rotates the first hub segment about the leading edge pitch axis.

In some embodiments, the first actuation arm is fixedly coupled to the first actuation head at a first end of the first actuation arm and extends axially away from the first actuation head, a second end of the first actuation arm opposite the first end is configured to be moved generally circumferentially relative to the first actuation head such that the first actuation arm is configured to be pivoted about the leading edge pitch axis along with the first actuation head, and the second actuation arm is fixedly coupled to the second actuation head at a first end of the second actuation arm and extends axially away from the second actuation head, a second end of the second actuation arm opposite the first end is configured to be moved generally circumferentially relative to the second actuation head such that the second actuation arm is configured to be pivoted about the leading edge pitch axis along with the second actuation head.

According to a further aspect of the present disclosure, a method comprises arranging a fan duct circumferentially around a central axis, providing a fan comprising a plurality of fan blades that extend radially outward relative to the central axis and that are adapted to rotate about the central axis to force fan exit air toward an aft end of the fan duct, arranging an outlet guide vane assembly in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane, a first actuation assembly arranged radially outward of a leading edge portion of the first variable leading edge outlet guide vane, and a second actuation assembly arranged radially inward of the leading edge portion, the first variable leading edge outlet guide vane extending radially relative to the central axis and including the leading edge portion and a fixed aft portion, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, coupling a first actuation head to the first tip segment and coupling a first actuation arm to the first actuation head, coupling a second actuation head to the first hub segment and coupling a second actuation arm to the second actuation head, rotating the first actuation arm so as to cause rotation of the first actuation head so as to cause rotation of first tip segment so as to selectively rotate the first tip segment about the leading edge pitch axis to a first pitch angle relative to the incoming fan exit air, and rotating the second actuation arm so as to cause rotation of the second actuation head so as to cause rotation of first hub segment so as to selectively rotate the first hub segment independent of the first tip segment about the leading edge pitch axis to a second pitch angle relative to the incoming fan exit air.

These and other features of the present disclosure will become more apparent from the following description of the illustrative embodiments.

DETAILED DESCRIPTION

Figure 1:
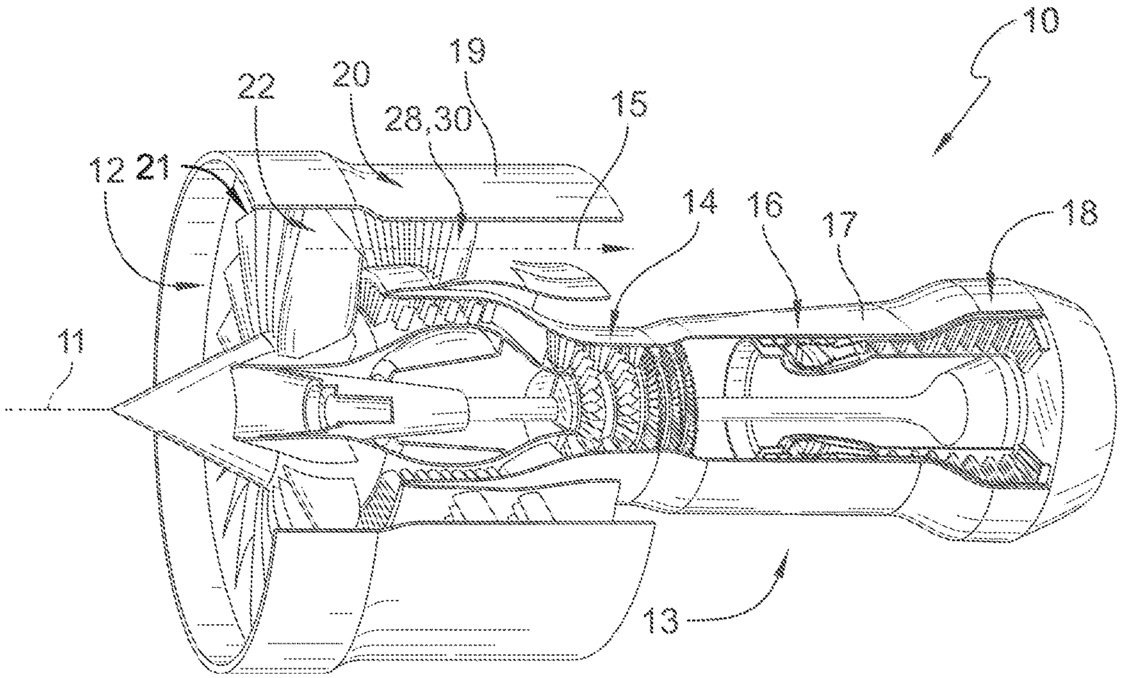
FIG. 1 is a cutaway view of a gas turbine engine that includes a fan assembly having a fan having plurality of fan blades that extend radially outward relative to the central axis, an engine core having a compressor, a combustor, and a turbine, and an outlet guide vane assembly located in a fan duct axially downstream of the plurality of fan blades that is configured to reduce the incidence between the outlet guide vane assembly and the fan exit air received from the fan blades and return the flow to generally axial flow.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly 12 and an engine core 13 having a compressor 14, a combustor 16, and a turbine 18, as shown in FIG. 1. The fan assembly 12 is driven by the turbine 18 and provides thrust for propelling an air vehicle by forcing fan exit air 15 through a fan duct 20 that circumferentially surrounds an outer casing 17 of the engine core 13. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan may be replaced with a propeller, drive shaft, or other suitable configuration.

Figure 2:
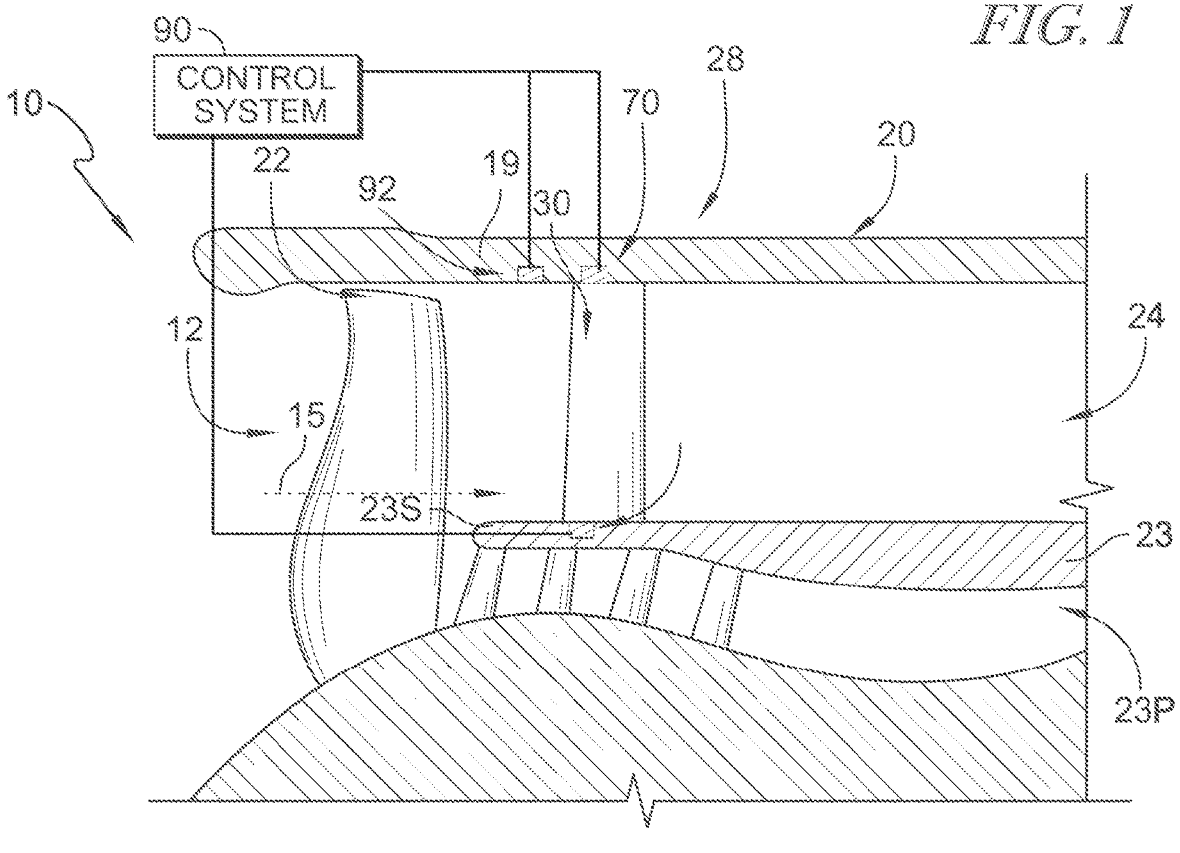
FIG. 2 is a side cross-sectional view of the gas turbine engine of FIG. 1, showing the fan assembly including the plurality of fan blades, showing that the engine further includes an outer casing and an inner wall that define a fan duct passage through which the fan exit air flows, showing that the outlet guide vane assembly includes a first variable leading edge outlet guide vane having a first tip segment and a first hub segment configured to more closely match the vane to distorted fan exit air, and showing that the first tip and hub segments are hinged to each other.

The fan assembly 12 includes a fan 21 having a plurality of fan blades 22 that extend radially outward relative to the central axis 11 and that are located in the inlet of the gas turbine engine 10, as shown in FIGS. 1 and 2. The fan blades 22 direct at least a portion of the air flowing over the blades 22, this portion being fan exit air 15 as shown in FIGS. 1 and 2, through the fan duct 20 such that the fan exit air 15 bypasses the engine core 13 and provides additional thrust for the gas turbine engine 10. The fan duct 20 includes an outer fan duct casing 19 and an inner wall 23 that together define an annular fan duct passage 24 through which the fan exit air 15 flows and subsequently exits the fan duct 20 into the ambient air surrounding the engine 10. The inner wall 23 may include an axially forward end 23S that functions as a splitter such that a portion of the incoming fan exit air 15 enters the engine core through the engine core passage 23P radially inward of the inner wall 23 and a portion of the fan exit air 15 enters the fan duct 20.

Figure 3:
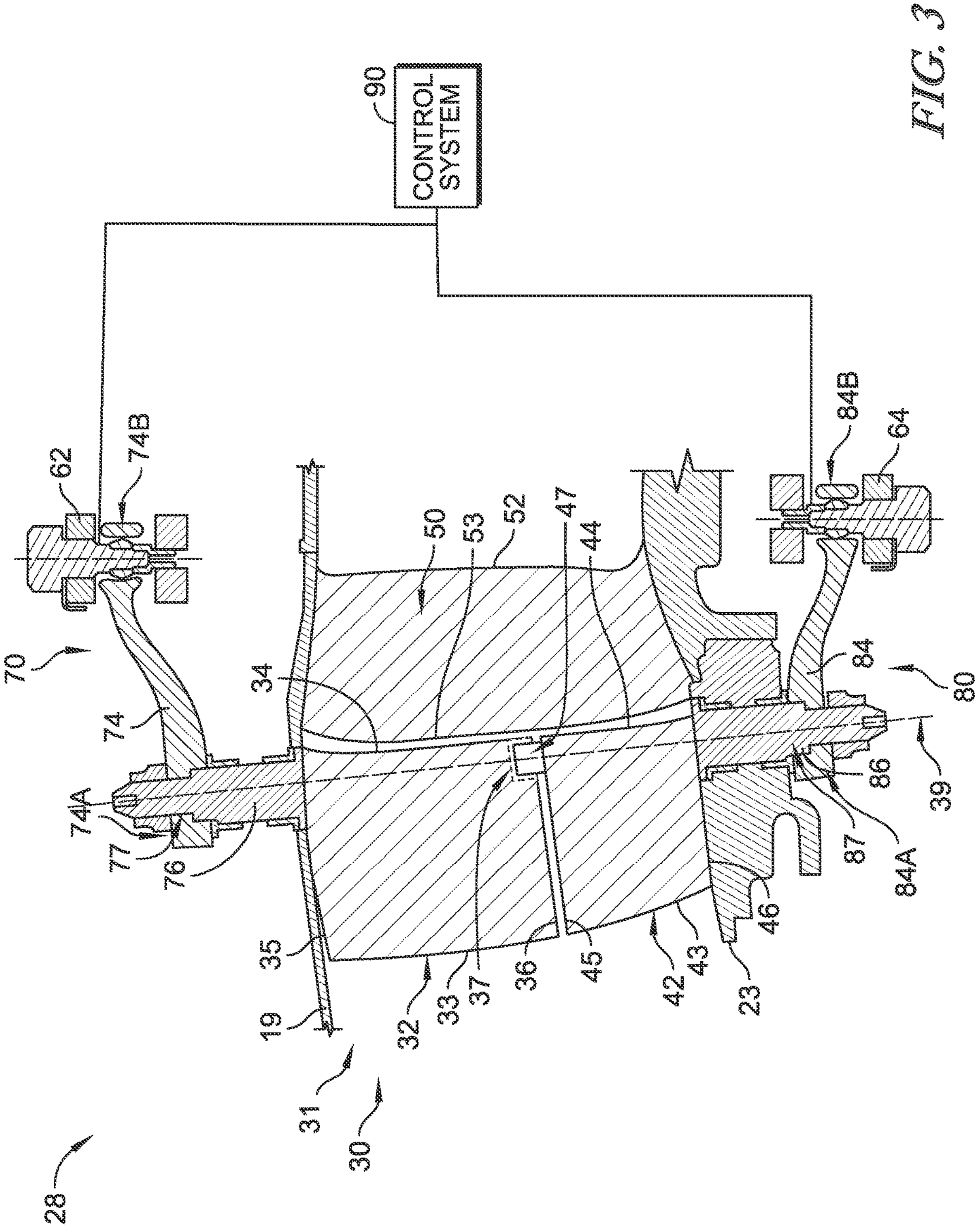
FIG. 3 is a side cross-sectional view of the first variable leading edge outlet guide vane of FIG. 2, showing that the first variable leading edge outlet guide vane includes the first tip segment and the first hub segment, and showing that the outlet guide vane assembly includes a first actuation assembly arranged radially outward of the leading edge portion and a second actuation assembly arranged radially inward of the leading edge portion.

In the illustrative embodiment, the fan assembly 12 further includes outlet guide vane assembly 28 located in the fan duct 20 axially downstream of the plurality of fan blades 22 that is configured to reduce the incidence between the outlet guide vane assembly 28 and the fan exit air 15 received from the plurality of fan blades 22 and return the flow to generally axial flow, as shown in FIG. 2. In some embodiments, the outlet guide vane assembly 28 is arranged axially downstream of the axially forward end 23S of the inner wall 23. In the illustrative embodiment, the outlet guide vane assembly 28 includes a first variable leading edge outlet guide vane 30 having a leading edge portion 31 and a fixed aft portion 50, as shown in FIG. 3. The leading edge portion 31 includes a first tip segment 32 configured to rotate about a leading edge pitch axis 39 and a first hub segment 42 located radially inward of and separate from the first tip segment 32, also configured to rotate about the leading edge pitch axis 39.

The first variable leading edge outlet guide vane 30 extends radially outward relative to the central axis 11, as shown in FIG. 3. In some embodiments, the first variable leading edge outlet guide vanes 30 may include a plurality of first variable leading edge outlet guide vanes 30 disposed around a circumferential extent of the inner wall 23 define a first outlet guide vane stage.

Figure 4A:
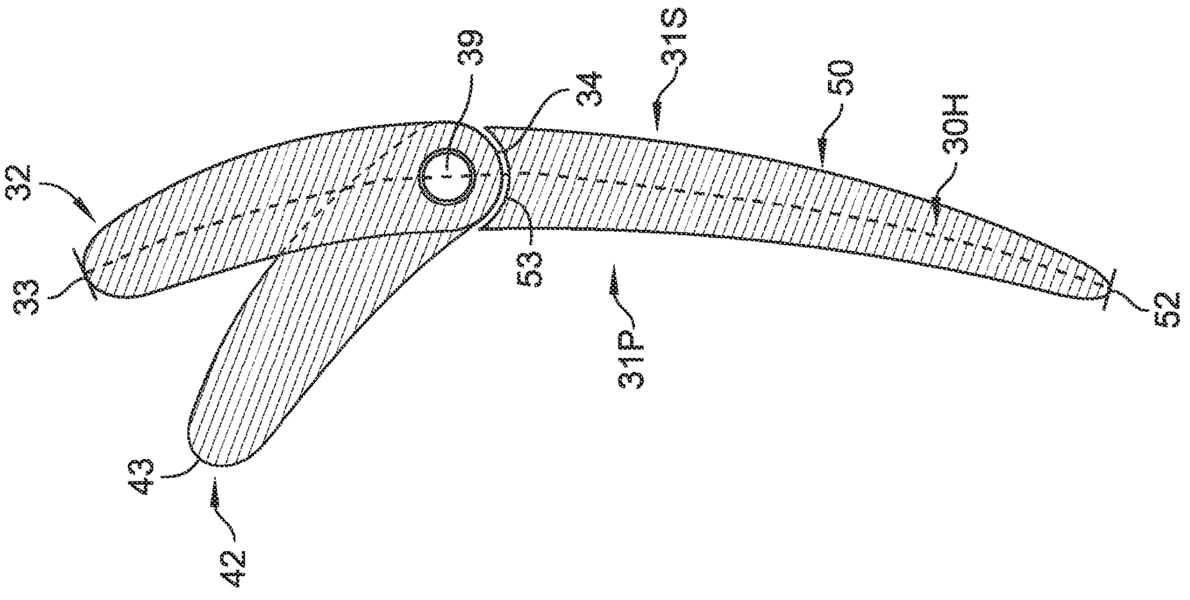
FIG. 4A is a top cross-sectional view of the first variable leading edge outlet guide vane of FIG. 3, showing the first hub segment rotated to a pitch angle and the first tip segment at a neutral position.

As shown in FIG. 3 and contextualized in FIG. 4A, the first variable leading edge outlet guide vane 30 includes an airfoil shape. The first tip segment 32 includes a leading edge 33 located at a forward end of the segment 32, a trailing edge 34 axially spaced apart from the leading edge 33 and located at an aft end of the segment 32, a radially outer side 35, and a radially inner side 36. Similarly, the first hub segment 42 includes a leading edge 43 located at a forward end of the segment 42, a trailing edge 44 axially spaced apart from the leading edge 43 and located at an aft end of the segment 42, a radially outer side 45, and a radially inner side 46.

Together, the first tip and hub segments 32, 42 form the leading edge portion 31. As shown in FIG. 4A, the leading edge portion 31 and the fixed aft portion 50 together form the overall vane 30, which includes a pressure side surface 31P that extends between the leading edges 33, 43 of the segments 32, 42 and a trailing edge 52 of the fixed aft portion 50 on one side of the vane 30. Similarly, a suction side surface 31S extends between the leading edges 33, 43 of the segments 32, 42 and a trailing edge 52 of the fixed aft portion 50 on an opposing side of the vane 30. Illustratively, the leading edge portion 31 is approximately one-half of the total chord length 30H of the vane 30, while the fixed aft portion 50 is approximately one-half of the total chord length 30H. In other embodiments, the leading edge portion 31 is approximately one-third of the total chord length 30H of the vane 30, while the fixed aft portion 50 is approximately two-thirds of the total chord length 30H.

The first tip and hub segments 32, 42 are configured to rotate about the leading edge pitch axis 39, as shown in FIG. 3. In the illustrative embodiment, the leading edge pitch axis 39 is located closer to the trailing edges 34, 44 of the segments 32, 42 than the leading edges 33, 43. In this manner, the first tip and hub segments 32, 42 can rotate proximate to the fixed aft portion 50 such that airflow remains uninterrupted while flowing over the vane 30.

Figure 7:
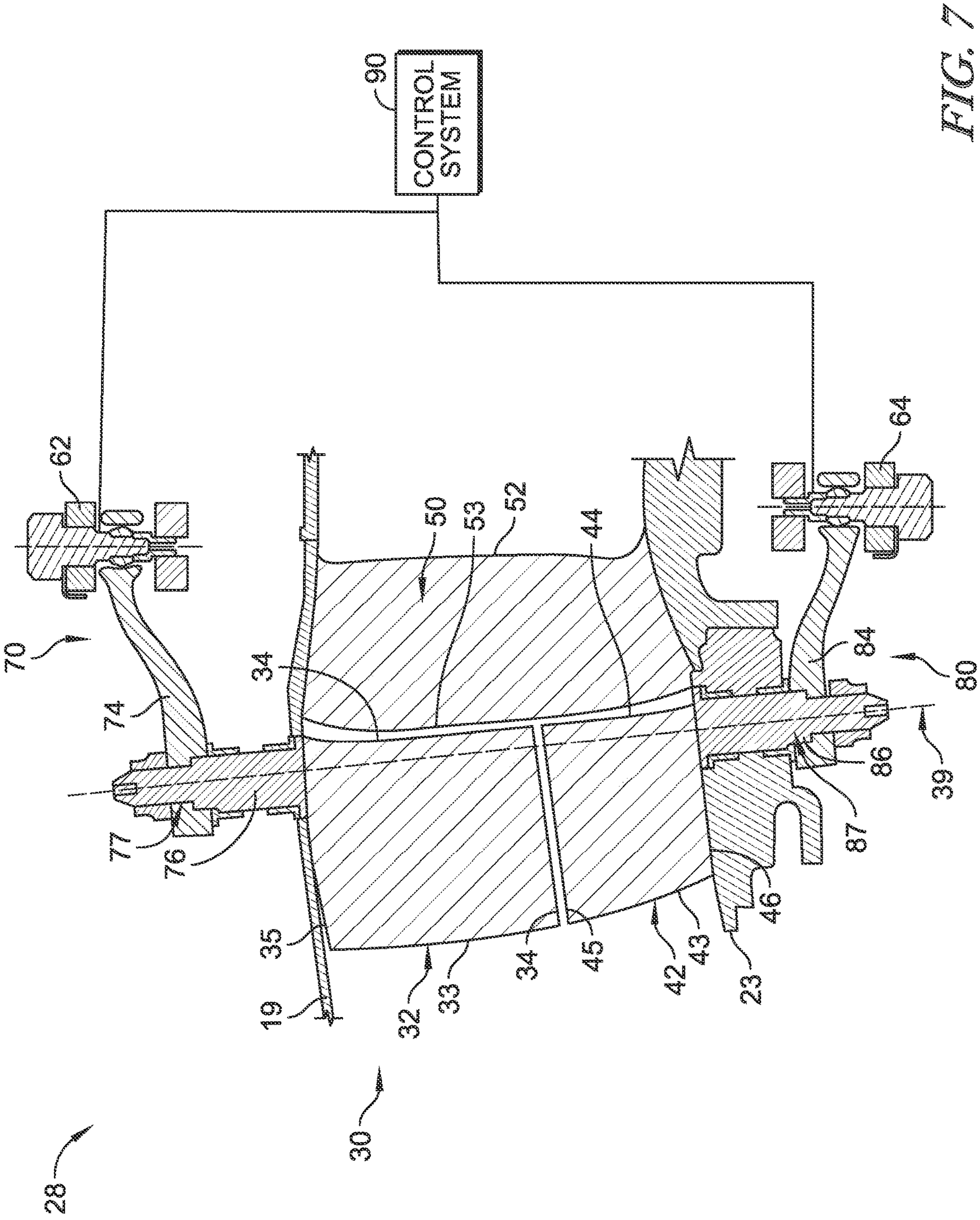
FIG. 7 is a side cross-sectional view of the first variable leading edge outlet guide vane of FIG. 3, showing that the first tip and hub segments are not hinged to each other.
Figure 8:
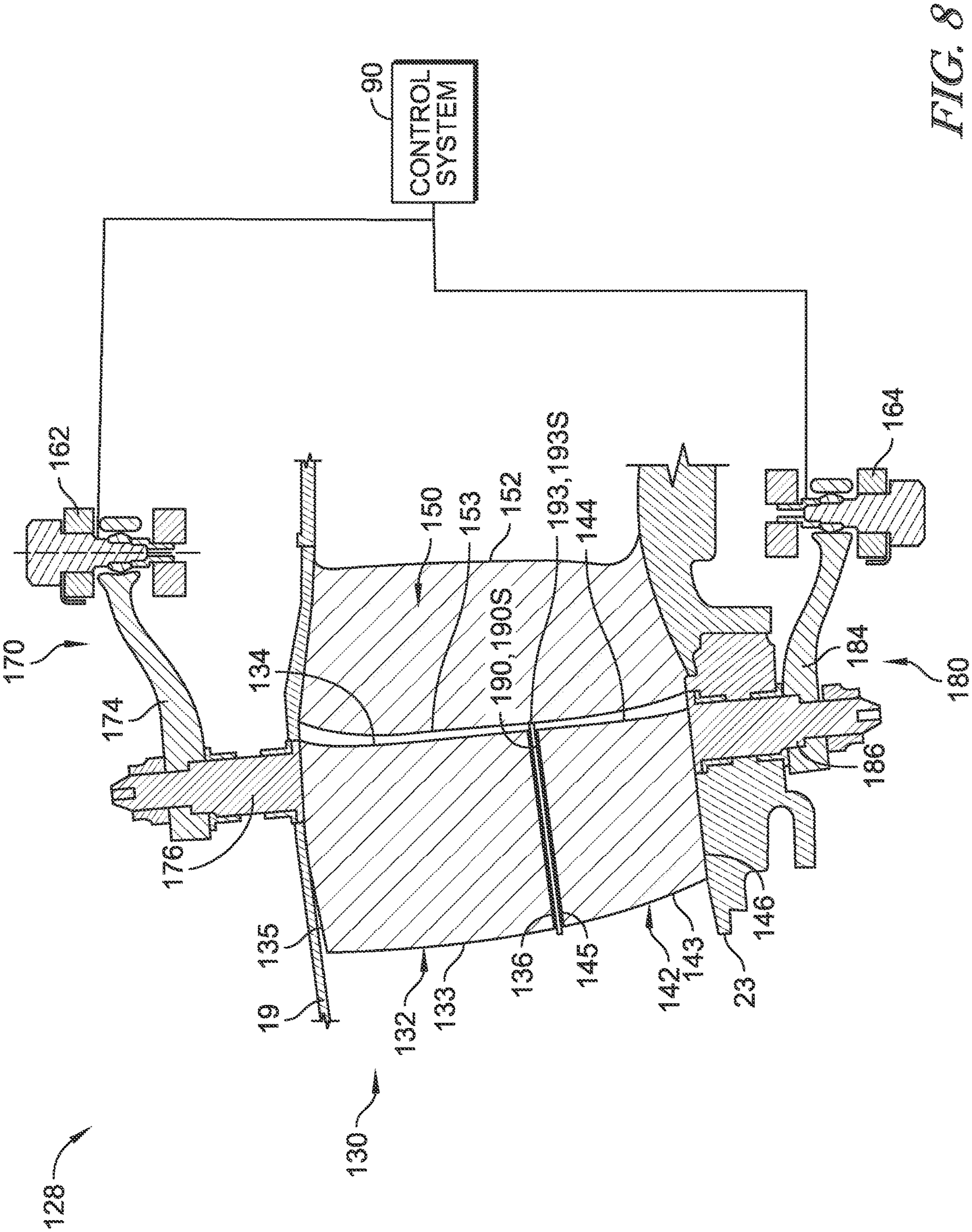
FIG. 8 is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion and a second actuation assembly arranged radially inward of the leading edge portion, and showing that the guide vane further includes a first air manipulating member arranged radially between the first tip segment and the first hub segment.

The first hub segment 42 is configured to independently rotate about the leading edge pitch axis 39 relative to the first tip segment 32, and may include a small radial gap therebetween. In some embodiments, the first hub segment 42 can include a hinge rod 47 extending radially outwardly from the radially outer side 45 of the first hub segment 42. The first tip segment 32 can include a hinge rod receiving cavity 37 configured to securely receive the hinge rod 42 so as to add stability to the rotation of the two segments 32, 42 relative to each other while allowing for independent rotation. The hinge rod 47 of the first hub segment 42 and the hinge rod receiving cavity 37 of the first tip segment 32 can each be cylindrical and aligned with the leading edge pitch axis 39. In some embodiments in which the first tip and hub segments 32, 42 are formed of a sufficiently stiff material, a hinge rod may be omitted, as shown in FIG. 7.

To rotate independently, the illustrative embodiment of the outlet guide vane assembly 28 includes a first actuation assembly 70 associated with the first tip segment 32 and a second actuation assembly 80 associated with the first hub segment 42. The first actuation assembly 70 is arranged radially outward of the leading edge portion 31 and includes a first actuation arm 74 and a first actuation head 76, the first actuation arm 74 extending axially away from the first actuation head 76. The second actuation assembly 80 is arranged radially inward of the leading edge portion 31 and includes a second actuation arm 84 and a second actuation head 86, the second actuation arm 84 extending axially away from the second actuation head 86.

The first actuation head 76 extends through the outer fan duct casing 19 and is fixedly coupled to the radially outer side 35 of the first tip segment 32, as shown in FIG. 3. Specifically, the first actuation head 76 is aligned with the leading edge pitch axis 39 such that rotation of the first actuation head 76 rotates the first tip segment 32 about the leading edge pitch axis 39. In some embodiments, the actuation head 76 is cylindrical having a central axis that aligns with the leading edge pitch axis 39. The first actuation head 76 is fixedly arranged within an opening 77 formed at a first end 74A of the first actuation arm 74. As a result, pivoting movement of the first actuation arm 74 about the leading edge pitch axis 39 rotates the first actuation head 76, which in turn rotates the first tip segment 32. In some embodiments, the first actuation arm 74 is arranged radially outward of the vane 30 and the outer fan duct casing 19, as shown in FIG. 3.

The second actuation head 86 extends through the inner wall 23 and is fixedly coupled to the radially inner side 46 of the first hub segment 42, as shown in FIG. 3. Specifically, the second actuation head 86 is aligned with the leading edge pitch axis 39 such that rotation of the second actuation head 86 rotates the first hub segment 42 about the leading edge pitch axis 39. In some embodiments, the actuation head 86 is cylindrical having a central axis that aligns with the leading edge pitch axis 39. The second actuation head 86 is fixedly arranged within an opening 87 formed at a first end 84A of the second actuation arm 84. As a result, pivoting movement of the second actuation arm 84 about the leading edge pitch axis 39 rotates the second actuation head 86, which in turn rotates the first hub segment 42. In some embodiments, the second actuation arm 84 is arranged radially inward of the vane 30 and the inner wall 23, as shown in FIG. 3. The inner wall 23 may not define a radially outer wall or boundary of the engine core passage 23P such that the components of the second actuation assembly 80 can be arranged radially outward of the engine core passage 23P and not interrupt airflow therethrough.

As will be described in greater detail below, the first and second actuation arms 74, 84 are configured to be moved generally circumferentially relative to the first and second actuation heads 76, 86, respectively, by annular rings, segmented annular rings, or individual actuators so as to pivot the actuation arms 74, 84 about the leading edge pitch axis 39. In particular, the actuation arms 74, 84 may be selectively pivoted about the leading edge pitch axis 39 so as to rotate the respective actuation head 76, 86 so as to selectively rotate the first tip and hub segments 32, 42 about the leading edge pitch axis 39. As a result, the first tip segment 32 can be selectively rotated about the leading edge pitch axis 39 to a first pitch angle relative to the incoming fan exit air 15. Similarly, the first hub segment 42 can be selectively rotated about the leading edge pitch axis 39 to a second pitch angle relative to the incoming fan exit air 15. The fixed aft edge 50 rotates any flow back to near axial to minimize loss from swirl.

In this way, the first tip and hub segments 32, 42 can be individually controlled with respect to each other to the same or differing angles, thus allowing for a multitude of segment positions and arrangements to be achieved. This provides for great flexibility in managing incoming airflows which may include distortions and disturbances. This can be particularly useful in embedded engine applications with complex intake and inlet duct geometries. In such scenarios, the distortion flows have more significant gradients and vortices, even in flight, so accommodation is necessary to maintain fan operability and performance.

Figure 4B:
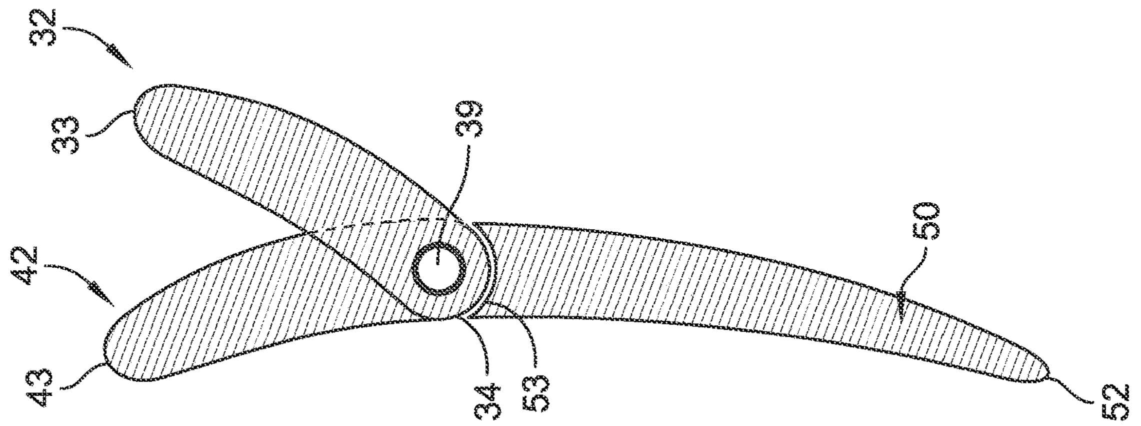
FIG. 4B is a top cross-sectional view of the first variable leading edge outlet guide vane of FIG. 3, showing the first tip segment rotated to a pitch angle and the first hub segment at a neutral position.
Figure 4C:
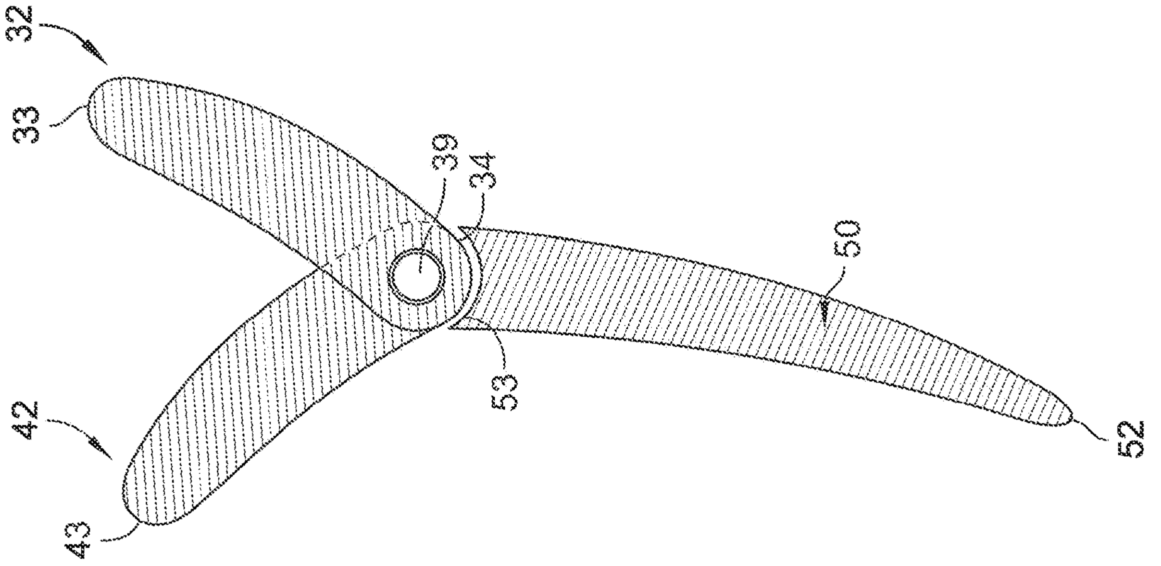
FIG. 4C is a top cross-sectional view of the first variable leading edge outlet guide vane of FIG. 3, showing the first hub segment and the first tip segment rotated to differing pitch angles.

In one exemplary arrangement, as shown in FIG. 4A, the first hub segment 42 can be rotated to a first pitch angle and the first tip segment 32 may remain at a neutral position. In another exemplary arrangement, as shown in FIG. 4B, the first tip segment 32 can be rotated to a first pitch angle and the first hub segment 42 may remain at a neutral position. In another exemplary arrangement, as shown in FIG. 4C, the first tip and hub segments 32, 42 can both be rotated to different pitch angles.

Figure 5A:
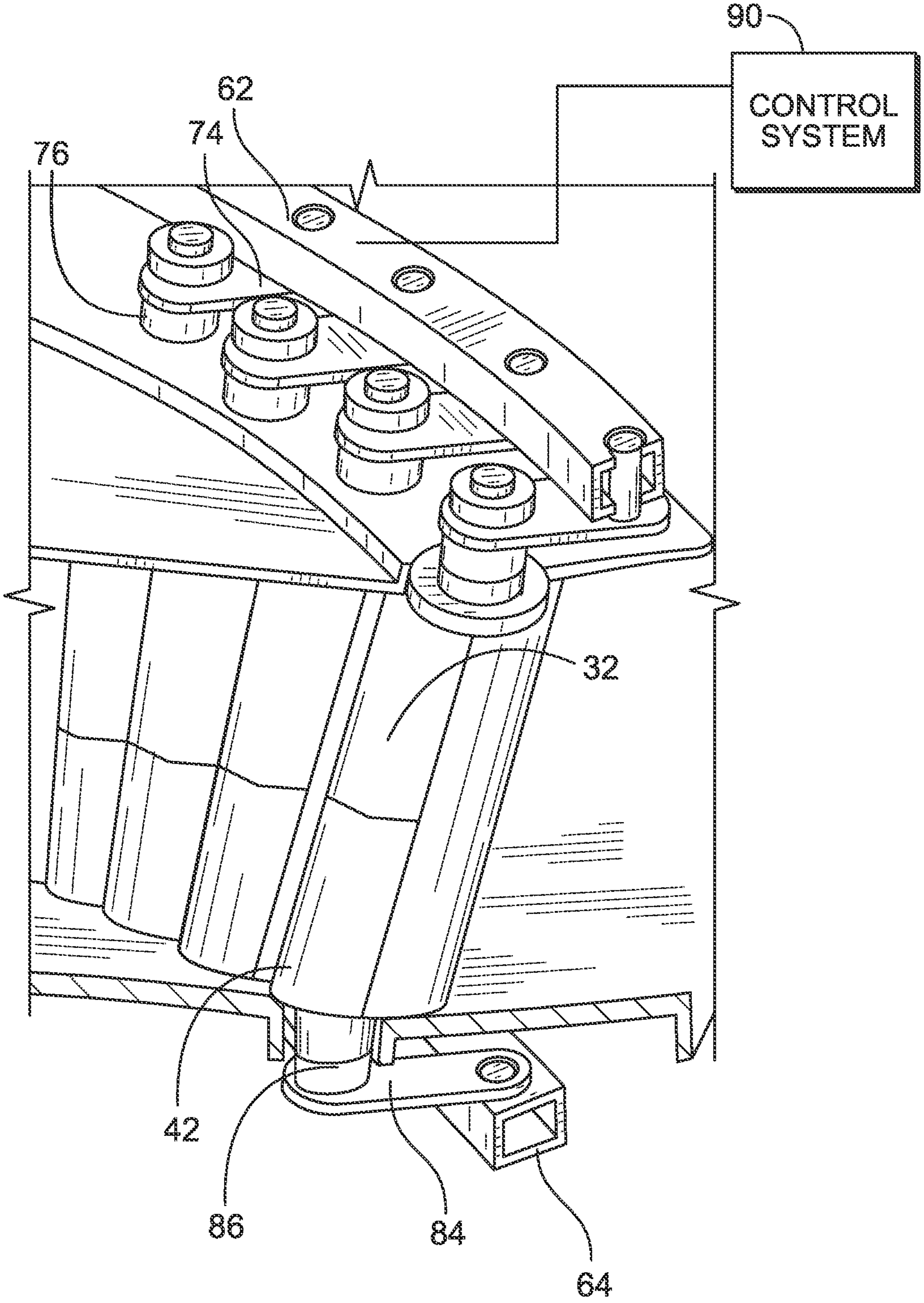
FIG. 5A is a side cutaway perspective view of a plurality of the first variable leading edge outlet guide vanes of FIG. 3, showing that the first actuation heads are connected to a full annular ring via actuation arms.
Figure 5B:
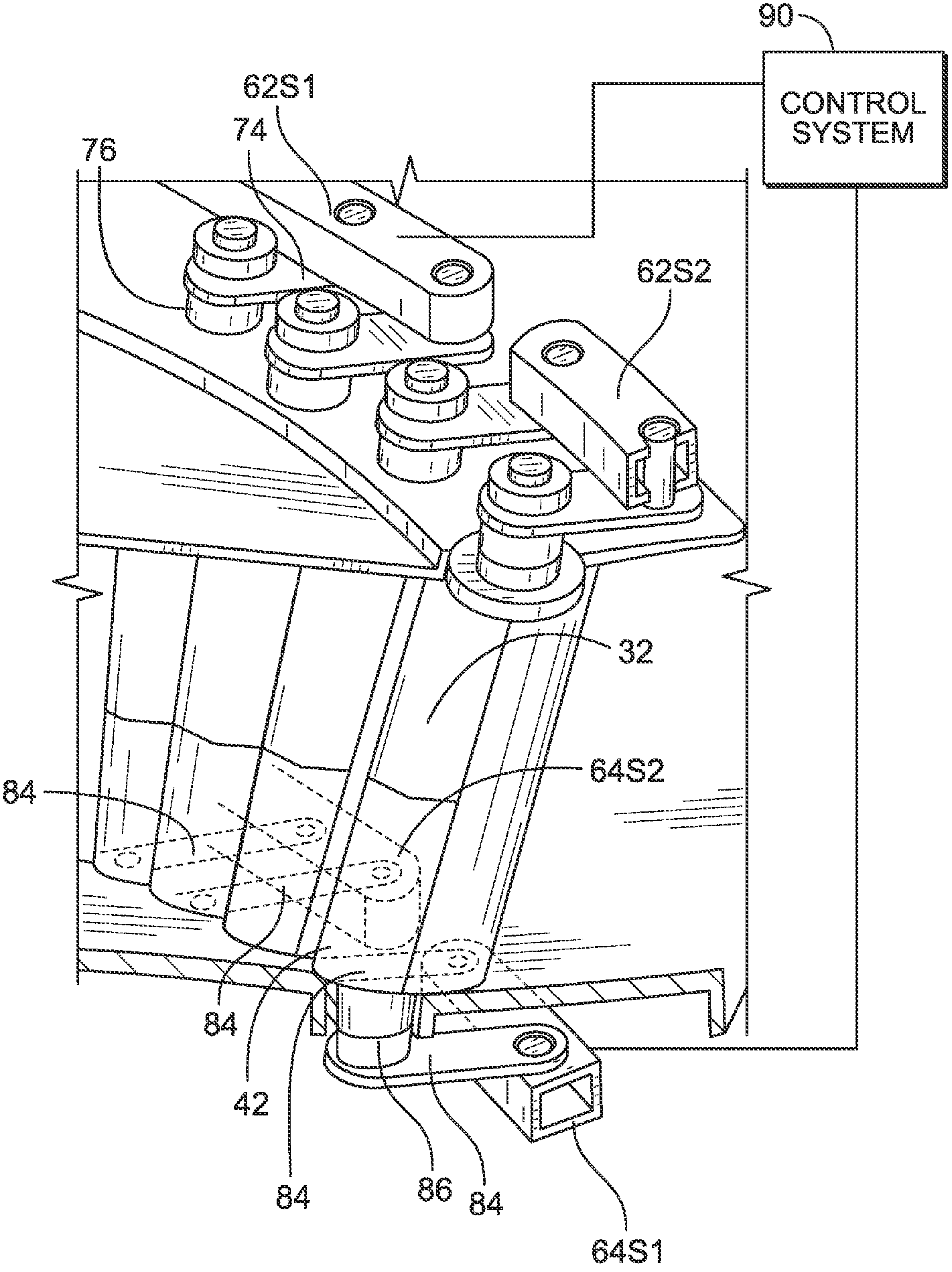
FIG. 5B is a side cutaway perspective view of a plurality of the first variable leading edge outlet guide vanes of FIG. 3, showing that two groups of first actuation heads are connected to annular ring segments via actuation arms, the segments being spaced apart circumferentially.
Figure 6:
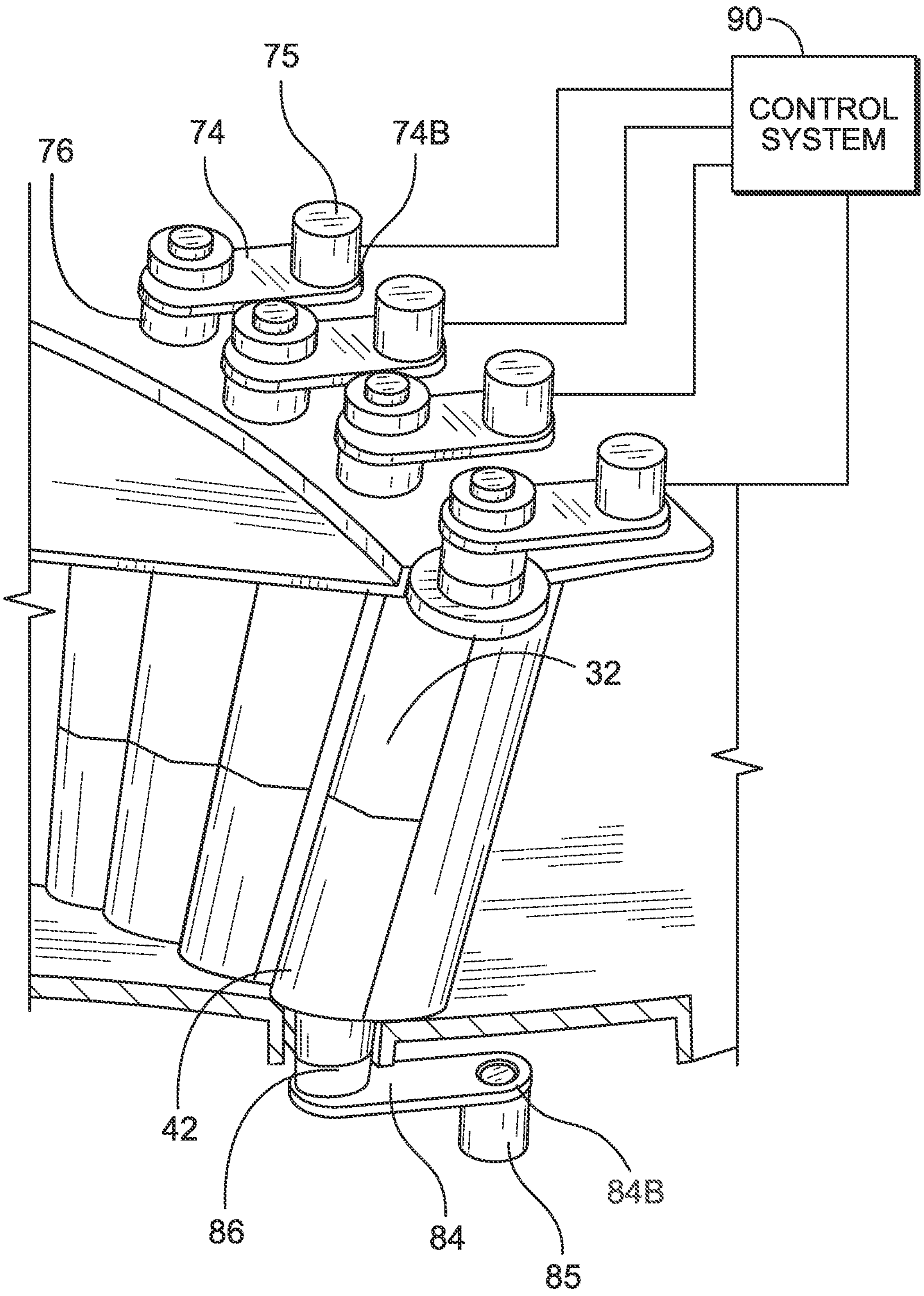
FIG. 6 is a side cutaway perspective view of a plurality of the first variable leading edge outlet guide vanes of FIG. 3, showing that the first actuation heads are each connected to individual actuators, which are connected to a control system.

As shown in FIG. 3, and in greater detail in FIGS. 5A, 5B, and 6, the outlet guide vane assembly 28 can further include a plurality of variable leading edge outlet guide vanes 30 arranged around the entirety of the circumferential extent of the vane assembly 28. The plurality of variable leading edge outlet guide vanes 30 include the first variable leading edge outlet guide vane 30 described above. Each variable leading edge outlet guide vane 30 of the plurality of variable leading edge outlet guide vanes 30 includes a respective tip segment 32 and hub segment 42, as well as respective actuation assemblies 70, 80. The first and second actuation arms 74, 84 of each vane 30 may be coupled to respective annular rings (for example, first and second annular rings 62, 64) that extend circumferentially about the central axis 11. The actuation arms 74, 84 may be coupled to the rings 62, 64 via an opening formed at a second end 74B, 84B of each actuation arm 74, 84.

As can be seen in FIG. 5A, the outlet guide vane assembly 28 may include a fully annular first annular ring 62 and a fully annular second annular ring 64. In this configuration, the first and second annular rings 62, 64 can be configured to rotate about the central axis 11 so as to move each actuation arm 74, 84 coupled thereto generally circumferentially relative to the first and second actuation heads 76, 86, or in other words, to pivot each actuation arm 74, 84 coupled thereto about the leading edge pitch axis 39. As a result, the rotation of the first and second annular rings 62, 64 about the central axis 11 causes rotation of the first tip and hub segments 32, 42, respectively. The first annular ring 62 can be rotated to a different rotational position as compared to the second annular ring 64 so as to rotate the first tip segment 32 to a different pitch angle than the first hub segment 42. As will be described in detail below, the annular rings 62, 64 may be controlled by a control system 90.

In some scenarios, it may be beneficial to have more control over individual sections of the plurality of variable leading edge outlet guide vanes 30 or individual vanes 30. This may be particular useful when the engine experiences more significantly distorted flows, such as in embedded engine applications. Sectional control or individual control would provide additional flexibility to accommodate as much flow variation as possible to recover operability and performance margins. For example, as an aircraft maneuvers through ground crosswind or variations of flight orientations such as sideslip and pitch variations, the plurality of variable leading edge outlet guide vanes 30 can be rotationally moved in sections or independently to best reset the inlet angles and maximize the fan operability envelope. The optimized rest of the inlet angles improves stall margin, improves efficiency and performance, and reduces fan forcing debits.

As can be seen in FIG. 5B, first annular ring 62 may be broken up into segments so as to include multiple circumferential segments disposed about the central axis 11. In particular, the multiple circumferential segments are radially aligned with each other and circumferentially spaced apart. For example, the assembly 28 may include a first annular ring segment 62S1 and a second annular ring segment 62S2 radially aligned with the first annular ring segment 62S1, extending partially circumferentially about the central axis 11, and circumferentially offset from the first annular ring segment 62S1. Similarly, the assembly 28 may include a third annular ring segment 64S1 and a second annular ring segment 64S2 (shown in phantom) radially aligned with the third annular ring segment 64S1, extending partially circumferentially about the central axis 11, and circumferentially offset from the third annular ring segment 64S1.

In this configuration, the first and second annular ring segments 62S1, 62S2 can be configured to independently rotate about the central axis 11 so as to move each actuation arm 74, 84 coupled thereto generally circumferentially relative to the first and second actuation heads 76, 86, or in other words, to pivot each actuation arm 74, 84 coupled thereto about the leading edge pitch axis 39. The first and second annular ring segments 62S1, 62S2 are circumferentially spaced apart a great enough distance to allow maximum movement relative to each other. For example, in some scenarios, the first annular ring segment 62S1 may be moved in an opposing circumferential direction to the second annular ring segment 62S2 such that the respective tip segments 32 of their associated vanes 30 are rotated in opposing rotational directions. The third and fourth annular ring segments 64S1, 64S2 can be similarly configured.

The outlet guide vane assembly 28 can include multiple annular ring segments similar to the segments 62S1, 62S2, 64S1, 64S2 disposed around the entire circumferential extent of the assembly 28. As such, the multiple annular ring segments can define groups of vanes 30, the tip and hub segments 32, 42 of each being able to be rotated to unique pitch angles based on the circumferential movement and position of their respective annular ring segment. As will be described in detail below, the annular rings 62, 64 may be controlled by a control system 90.

In some embodiments, the control system 90 is configured to rotate each segment 32, 42 of each vane 30 of the first plurality of variable leading edge outlet guide vanes 30 individually relative to each other vane's 30 segments 32, 42, as shown in FIG. 6. That is to say, each segment 32, 42 of each vane 30 may be rotated without moving any of the other vanes' segments 32, 42 of the first and second plurality of variable leading edge outlet guide vanes 30. This allows for the vanes 30 to be controlled in a variety of configurations. For example, a group of the plurality of variable leading edge outlet guide vanes 30 may be controlled to be rotated in unison and rotated to a first pitch angle, while other vanes 30 are individually controlled, each to unique pitch angles. The individual controllability of the vanes 30 accounts for variations in the fan exit air 15 around the circumference of the area of the plurality of variable leading edge outlet guide vanes 30, which is particularly beneficial for the reasons discussed above.

In another example, if the rotation of the first plurality of guide vanes 30 causes more undesirable flow effects in certain circumferential sectors, only vanes 30 located in those certain circumferential sectors may be rotated to specific pitch angles to reduce losses from said flow effects, while other vanes 30 may be rotated to different pitch angles. Then, if the flow dynamically encounters different distortions during operation, different circumferential sectors may require vane 30 adjustment. The individual controllability allows for the option to adjust these different circumferential sectors dynamically.

In order to carry out the individual control, the second ends 74B, 84B of the actuation arms 74, 84 may include a control member 75 coupled to an external actuator (not shown) that moves the actuation arms 74, 84 generally circumferentially relative to the first and second actuation heads 76, 86. In other embodiments, the first and second actuation heads 76, 86 may be individually actuated via an actuator coupled directly to the actuation head 76, 86, for example an actuator coupled to a radially outer side of the first actuation head 76 and an actuator coupled to a radially inner side of the second actuation head 86.

As touched on above, by controlling the segments 32, 42 of at least one vane 30 of the plurality of variable leading edge outlet guide vanes 30, the control system 90 is configured to control at least some of the flow of the fan exit air 15 after it passes over and exits the fan blades 22. By controlling the entirety of the plurality of variable leading edge outlet guide vanes 30, the control system 90 can accommodate the overall flow of the fan exit air 15, in particular distorted flow, after it passes over and exits the fan blades 22 in order to control fan blade 22 response to forces acting on the fan blades 22, as well as to reduce losses created by undesirable variations in the air flow. Moreover, because the fan exit air 15 may not be uniform as it exits the fan blades 22, the plurality of variable leading edge outlet guide vanes 30 or the axial passage between the vanes 30 and the fan blades 22 operate further from their ideal design conditions. By adjusting the plurality of variable leading edge outlet guide vanes 30, parameters such as incidence are improved, and detrimental flow conditions and losses in the vanes 30 or the axial passage between the vanes 30 and the fan blades 22 such as fan forcing and stall margin losses are reduced.

In some embodiments, the control system 90 is configured to rotate the segments 32, 42 of each vane 30 of the first plurality of variable leading edge outlet guide vanes 30 to a first vane-pitch angle in response to the gas turbine engine 10 operating at a given operating condition so as to reduce the incidence between the outlet guide vane assembly 28 and the fan exit air 15 received from the plurality of fan blades 22 and redirect the fan exit air 15 in a first direction, in particular a generally axial direction. In particular, the operating condition in which the fan assembly 12 and gas turbine engine 10 are operating in may include at least one of take-off, climb, cruise, descent, landing, and aircraft maneuvers of an aircraft having the engine 10 equipped. In each of these operating conditions, the plurality of fan blades 22 and/or the vanes 30 of the fan assembly 12 may experience various undesirable operability issues such as forcing, stall, and flutter. For example, the engine 10 may operate in particular speed ranges for each of the operating conditions, and as result, the fan blades 22 may experience greater or lower levels of forcing, stall, and/or flutter in response to the engine 10 operating in particular speed ranges.

In order to compensate for these forces acting on the fan blades 22, the control system 90 is configured to rotate the segments 32, 42 of the first plurality of variable leading edge outlet guide vanes 30 to an arrangement of first vane-pitch angles in order to alter the angle of the flow of fan exit air 15 after it exits the fan blades 22. This change in the angle of flow as the fan exit air 15 passes over the first plurality of variable leading edge outlet guide vanes 30 reduces the amount of forcing, stall, and/or flutter experienced by the fan blades 22 and/or the outlet guide vanes 30. Moreover, the control system 90 is configured to reset a desired incidence of air flow into the first plurality of variable leading edge outlet guide vanes 30 in response to swirl in the inlet flow. This produces an averaging effect that improves engine performance and efficiency. These arrangements of the vanes 30 can also recover the losses created by flow separation, flow distortions, vortices, and/or swirl.

The control system 90 is operable to control the segments 32, 42 of the first plurality of variable leading edge outlet guide vanes 30 in a variety of configurations and arrangements in order to compensate for inlet pressure distortion, vortices and swirl, thus reducing the forcing, stall, flutter, flow separation, and any other undesirable effects in the fan rotor or outlet vanes. For example, in some embodiments, the control system 90 is configured to rotate each vane 30 of the first plurality of guide vanes 30 in unison. In other words, all of the first plurality of guide vanes 30 move to the same first vane-pitch angle. In such embodiments, the each vane 30 may be mechanically connected to each other via the first and second annular rings 62, 64.

In some embodiments, the control system 90 is configured to rotate at least two different groups of the segments 32, 42 of variable leading edge outlet guide vanes 30. For example, the control system 90 may be configured to selectively rotate each group of vanes 30 to create non-uniform backpressure that drives the fan inlet distortion flows within the fan to change or redistribute around the circumference of the fan. This locally reduces loading on fan blades 22 within a lip separated flow with low local pressure to reduce forcing and/or improve the uniformity of flow in general through the fan to reduce forcing. In particular, fully opening (allowing full flow through the guide vanes) at least one group of vanes 30 and fully closing at least one further group of vanes 30 (allowing no flow through the guide vanes) reduces a tendency for a local stall of the fan blades 22 that could lead to early overall stall in the fan. In some embodiments, the control system 90 is configured to rotate a large group of vanes 30 which counters bulk swirling flows or local changes to improve localized intake swirl gradients to improve fan performance and operability.

In at least one additional embodiment, the plurality of variable leading edge outlet guide vane 30 are broken into unique groups of vanes 30, as shown in FIG. 5B. Each group of vanes 30 is mechanically connected to each other, or ganged, via a unique circumferentially extending annular ring segment, such as the annular ring segments 62S1, 62S2, 64S1, 64S2 shown in FIG. 5B. Although the illustrative embodiment shows each group of vanes 30 including two vanes 30, the vanes 30 may be grouped and ganged in any combination of at least two groups of vanes totaling at least one fewer vane than the total number of vanes 30 in the plurality of outlet guide vanes 30. For example, if the first plurality of outlet guide vanes 30 includes 60 vanes, a first group may include 30 vanes and a second group may include 30 vanes. As a further non-limiting example, a first group of vanes may include 50 vanes, a second group of vanes may include five vanes, and a third group of vanes may include five vanes.

In some embodiments, the first plurality of variable leading edge outlet guide vanes 30 includes a first group of first vanes 30 and a second group of first vanes 30 different from the first group of guide vanes 30. The control system 90 is configured to rotate the first group of first vanes 30 to a first vane-pitch angle and the second group of first vanes 30 to a second vane-pitch angle that is different from the first vane-pitch angle. The groups of vanes 30 may be individually controlled or each group may be ganged together. For example, in some embodiments, one half of the first plurality of outlet guide vanes 30 is the first group and the other half of the first plurality of outlet guide vanes 30 is the second group.

In some embodiments, the control system 90 utilizes predetermined arrangements of the plurality of variable leading edge outlet guide vanes 30 that are based on predetermined measurements and data taken in predetermined engine operating conditions and predetermined airflow characteristics. As such, the control system 90 is configured to rotate the vanes 30 to specific predetermined arrangements based on the operating condition and/or airflow characteristic(s) of the fan exit air 15 or the inlet air that the engine 10 and fan assembly 12 are operating in, or based on projected operating conditions and/or airflow characteristic(s) that will be encountered by the engine 10 during a mission.

In some embodiments, the predetermined arrangements of the segments 32, 42 of the plurality of variable leading edge outlet guide vanes 30 can be based on previously acquired test data corresponding to specific flight conditions. In a more complex arrangement, the control system 90 could be coupled to measurement systems, such as the at least one sensor 92 described below, that detect flow instabilities associated with impending fan stall to direct vane geometry changes to extend margins. The control system 90 may be more effective near stall as the vanes 30 can redistribute flow conditions to minimize local stall cells. Having smaller ganged vane 30 groups are efficient as well in that such groups only reduce losses locally to extend operability and performance.

In some embodiments, the control system 90 includes at least one sensor 92 configured to take real-time measurements of the air flow within the fan duct passage 24 and of forces acting on the fan assembly components, as shown in FIG. 2. The real-time measurements may be utilized in order to determine the operating condition and/or airflow characteristic(s) of the fan exit air 15 or the inlet air that the engine 10 and fan assembly 12 are operating in so as to inform the control system 90 to which predetermined arrangement to rotate the plurality of variable leading edge outlet guide vanes 30.

In some embodiments, the control system 90 includes a neural network configured to perform machine learning such that the control system 90 can iterate over the predetermined arrangements in order to calculate new arrangements that are applicable to new variations in the operating condition and/or airflow characteristics that are unaccounted for by the predetermined settings and arrangements.

In some embodiments, the control system 90 further includes a subsystem control that is integrated with other engine controls to further control reduction of losses created by undesirable variations in the air flow and improve engine performance and efficiency. For example, if rotation of vanes 30 resulted in a fan flow drop, the subsystem control is configured to compensate for this by increasing the fan speed in order to maintain thrust, and/or by changing the exhaust area of the engine 10 in order to further reduce the losses and improve engine efficiency.

In some embodiments, the at least one sensor 92 may be located proximate to the fan blades 22, proximate to the plurality of variable leading edge outlet guide vanes 30, or both, as shown in FIG. 2. In some embodiments, the sensor or sensors 92 are located in the outer casing 19 radially outward of the fan blades 22 and vanes 30. The at least one sensor 92 may include one of or a combination of dynamic sensors, static wall pressure sensors, altitude sensors, sensors configured to detect the angle of attack of the plurality of fan blades 22, sensors configured to detect the tip timing of the plurality of fan blades 22, and airspeed sensors. In some embodiments, the sensor 92 may be a dynamic pressure transducer. The sensor 92 may also be a sensor configured to measure a rotational speed of the fan blades 22, which could be used along with an additional sensor that is a dynamic pressure transducer.

In the illustrative embodiment, the functionality of the control system 90 described herein may be implemented in various processing and computing devices, and may be located within the engine 10 or outside of the engine 10. Moreover, the functionality may be configured to operate on executable software provided on the processing and computing devices.

Furthermore, the functionality disclosed herein may be implemented in various configurations using computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

A person skilled in the art will understand that all features and components of all embodiments described herein, including the guide vane assembly 28 described above and the outlet guide vane assemblies described below can be interchanged and modified to include some elements of some embodiments and other elements of other embodiments. For example, even though some embodiments are shown without a static central portion, these embodiments may include such a central portion, as described herein. Similarly, although some embodiments described two tip segments and two hub segments, some embodiments can include one tip and two hub segments, two tip and one hub segments, each with or without a static central hub section, or other combinations thereof. Similarly, the actuation assemblies can be interchanged, with some embodiments and configurations including pass-through actuation assemblies, two assemblies arranged at the tip and hub, different configurations of segmented and full annular rings, and the like.

Another embodiment of an outlet guide vane assembly 128 is shown in FIGS. 8-12. The outlet guide vane assembly 128 is similar to the outlet guide vane assembly 28 shown in FIGS. 1-7 and described herein. Accordingly, similar reference numbers in the 100 series indicate features that are common between the outlet guide vane assembly 128 and the outlet guide vane assembly 28. The description of the outlet guide vane assembly 28 is incorporated by reference to apply to the outlet guide vane assembly 128, except in instances when it conflicts with the specific description and the drawings of the outlet guide vane assembly 128.

Figure 9:
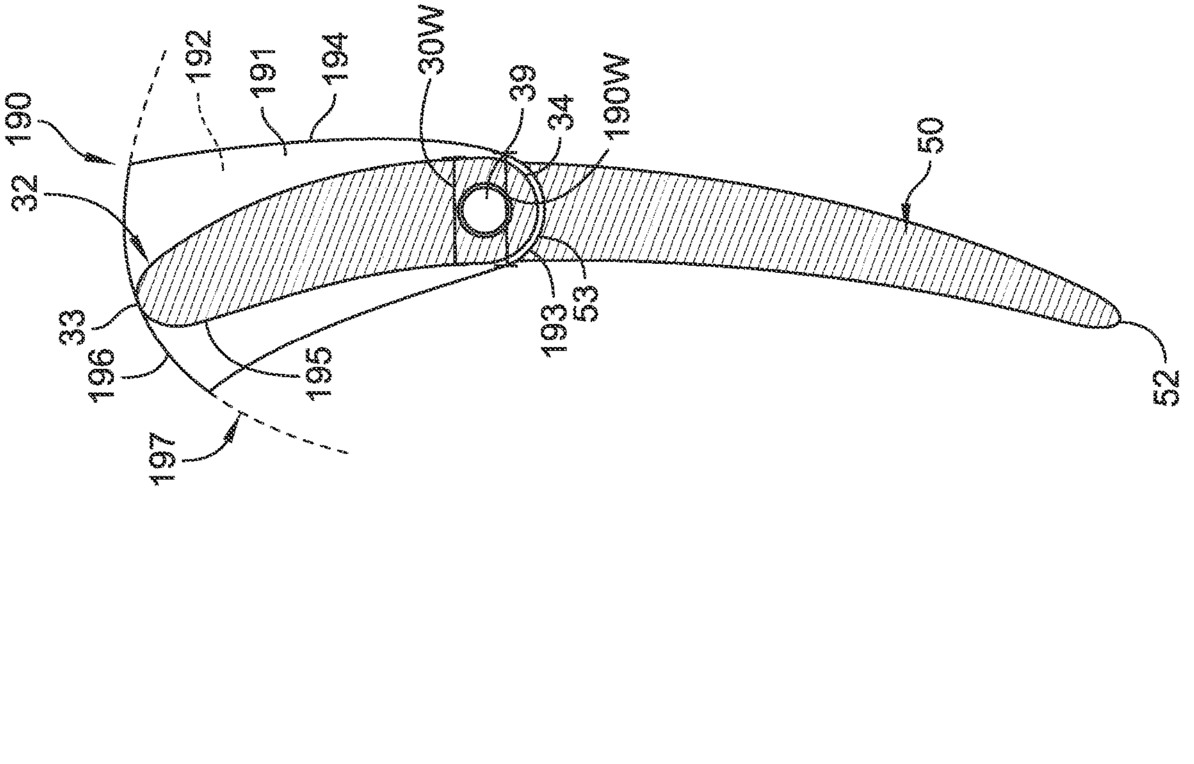
FIG. 9 is a top cross-sectional view of the first variable leading edge outlet guide vane of FIG. 8, showing the first tip segment at a neutral position and a top view of the first air manipulating member configured as a winglet.
Figure 10:
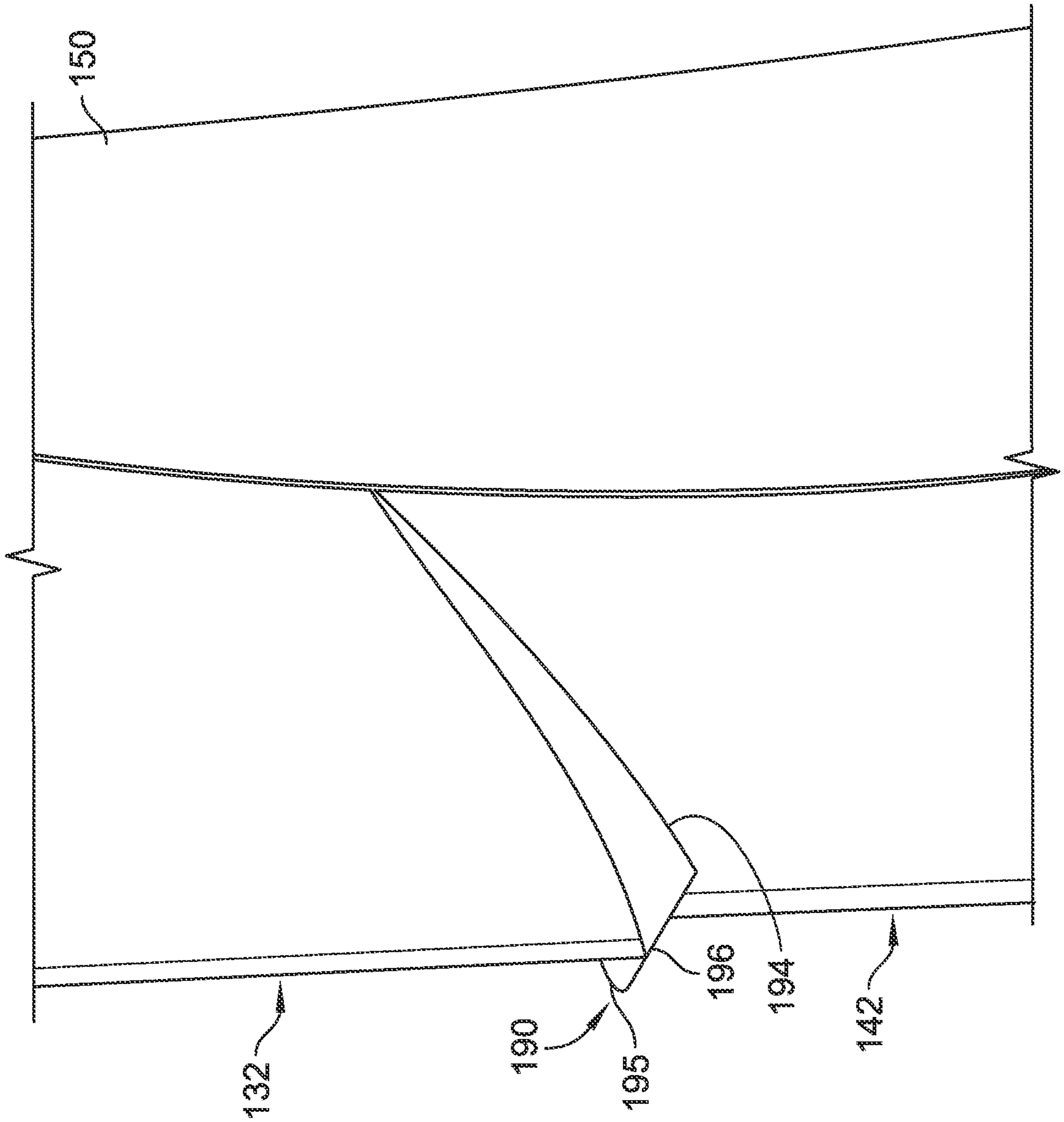
FIG. 10 is a perspective view of the first variable leading edge outlet guide vane of FIG. 8, showing the first air manipulating member configured as a winglet.
Figure 11:
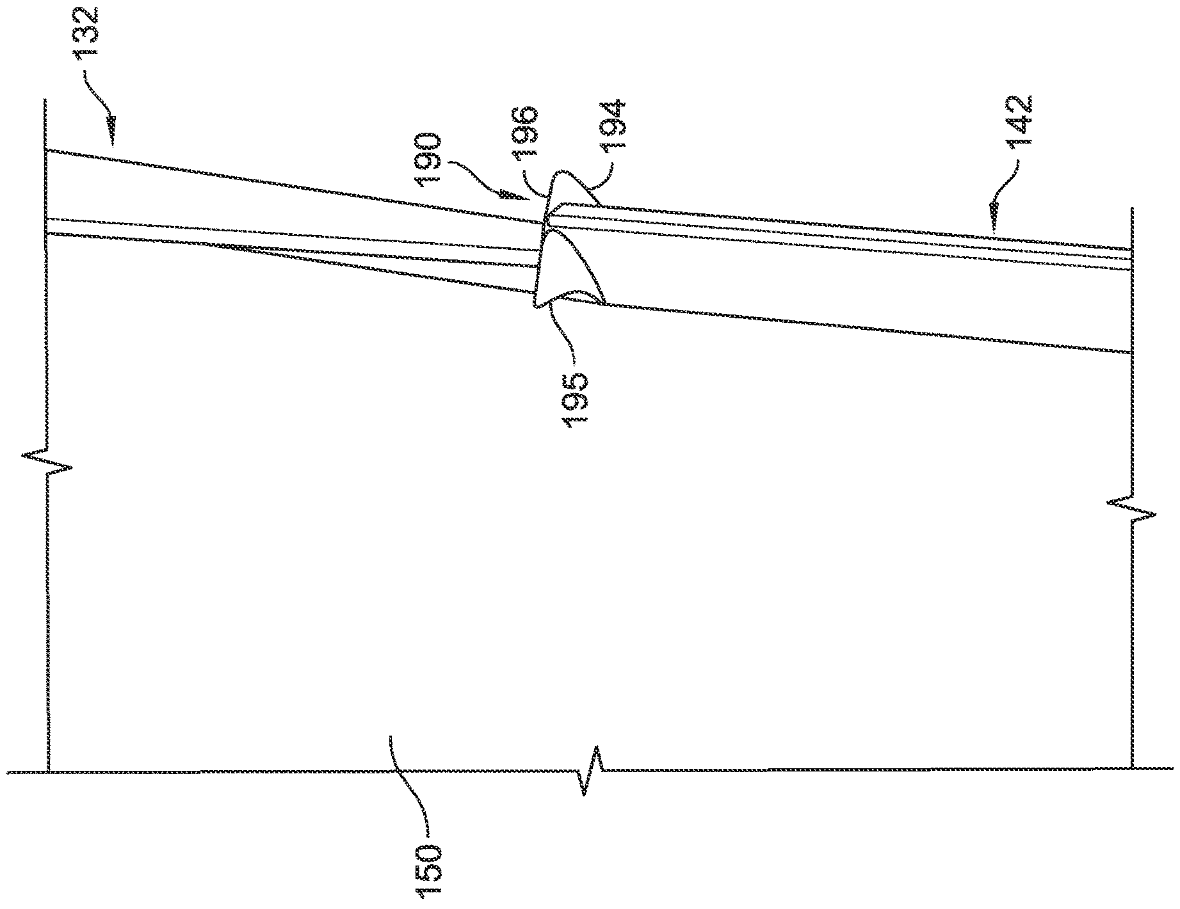
FIG. 11 is a front perspective view of the first variable leading edge outlet guide vane of FIG. 8, showing the first air manipulating member configured as a winglet.

Similar to the outlet guide vane assembly 28 described above, the outlet guide vane assembly 128 includes first tip and hub segments 132, 142. In this embodiment, an air manipulating member 190 may be arranged in the small radial gap between the first tip and hub segments 132, 142. In particular, in some embodiments, the air manipulating member 190 may be configured as a winglet 190 or platform coupled to an axially forward side 153 of the fixed aft portion 150, as shown in FIG. 9-11, or may be directly coupled to one of the sides 136, 145 of the tip and hub segments 132, 142. In other embodiments, the air manipulating member 190 may be configured as a seal 190S coupled to the axially forward side 153 of the fixed aft portion 150, or may be directly coupled to one of the sides 136, 145 of the tip and hub segments 132, 142.

As shown in FIGS. 9-11, the air manipulating member 190 may be configured as a winglet 190 that reduce radial flows across the tip and hub segments 132, 142. This is particularly helpful when the tip and hub segments 132, 142 are set to non-neutral, opposing pitch angles. As shown in FIG. 9, the winglet 190 may be generally planar and include a radially outer winglet surface 191 and a radially inner winglet surface 192, each surface generally facing radially. The winglet 190 further includes an axially aft end 193, a suction side edge 194, and a pressure side edge 195. The suction and pressure side edges 194, 195 may be curved similarly to the curvature of the airfoil shape of the vane 130.

The winglet 190 further includes a forward edge 196 that is curved. In some embodiments, the forward edge 196 is curved to match the rotational path, or path of movement, of the leading edge 133, 143 of the tip and hub segments 132, 142. In particular, the forward edge 196 may include a radius of curvature 197 that matches the rotational path of the tip and hub segments 132, 142, as shown in FIG. 9. In some embodiments, a width 190W of the winglet 190 is equal to or greater than a width 30W of the first tip segment 132 and the first hub segment 142 along an entire axial extent of the first tip segment 132 and the first hub segment 142. In some embodiments, the width of the winglet 190 at the axially aft end 193 is less than a length of the forward edge 196. In some embodiments, the winglet 190 has a radial height that allows for the seal to barely contact or nearly contact the sides 136, 145 of the tip and hub segments 132, 142 so as to prevent flow from entering this gap.

FIG. 10 and FIG. 11 show a side and front perspective view, respectively, of the winglet 190. In the example shown in FIG. 10, the tip segment 132 is moved to a first pitch angle, which is to the left of a neutral zero angle position when viewing FIG. 10 and FIG. 11. As can be seen, the forward edge 196 is long enough such that the pressure side edge 195 is located beyond the position of the tip segment 132 in the circumferential direction. In some embodiments, the forward edge 196 is formed to be long enough such that both the suction and pressure side edges 194, 195 are located outside of the potential range of pitch angle positions of the tip and hub segments 132, 142. In other words, the path of movement has a maximum first end point and a maximum second end point, and the length of the forward edge 196 is equal to or extends beyond the maximum first end point and the maximum second end point of the path of movement of the first tip segment 132 and/or and the first hub segment 142. This ensures that radial flows across the tip and hub segments 132, 142 will continue to be better matched at all pitch angle positions of the tip and hub segments 132, 142.

Figure 12:
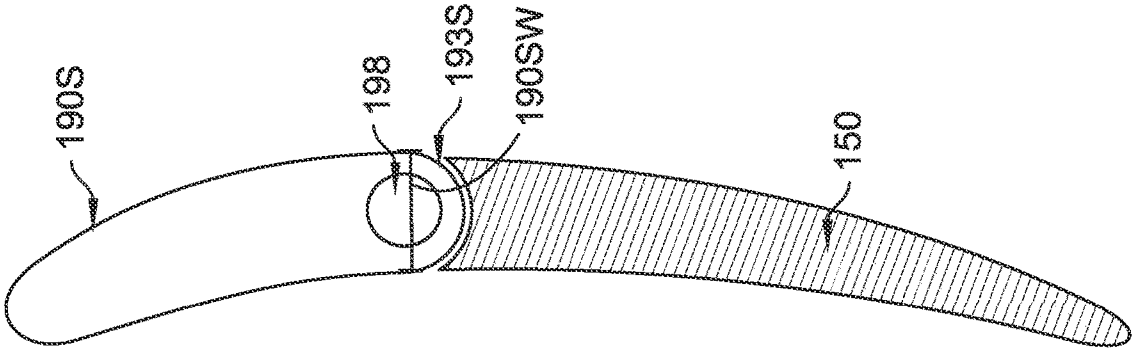
FIG. 12 is a top cross-sectional view of the first variable leading edge outlet guide vane of FIG. 8, showing a top view of the first air manipulating member configured as a scale.

As can be seen in FIG. 12, the air manipulating member 190 may be configured as a seal 190S which is coupled to the axially forward side 153 of the fixed aft portion 150 at an axially aft end 193S of the seal 190S. The seal 190S may be generally planar. In some embodiments, the seal 190S has a radial height that allows for the seal to barely contact or nearly contact the sides 136, 145 of the tip and hub segments 132, 142 so as to seal the radial gap between the segments 132, 142 and prevent flow from entering this gap. In some embodiments, the seal 190S may be directly coupled to the radially inner side 136 of the tip segment 132. In some embodiments, the seal 190S may be directly coupled to the radially outer side 145 of the hub segment 142. In some embodiments, a width 190SW of the seal 190S is equal to or greater than a width 30W of the first tip segment 132 and the first hub segment 142 along an entire axial extent of the first tip segment 132 and the first hub segment 142. In some embodiments, the seal 190S may include a cutout 198 so as to allow a hinge rod 137 to pass therethrough. The winglet 190 may include a similar cutout 198. In other embodiments in which the segments 132, 142 do not include a hinge rod, the cutout 198 would not be necessary. In some embodiments, an outer perimeter of the seal 190S generally corresponds to an outer perimeter of each of the first tip segment 132 and the first hub segment 142, as shown in FIG. 12.

Figure 13:
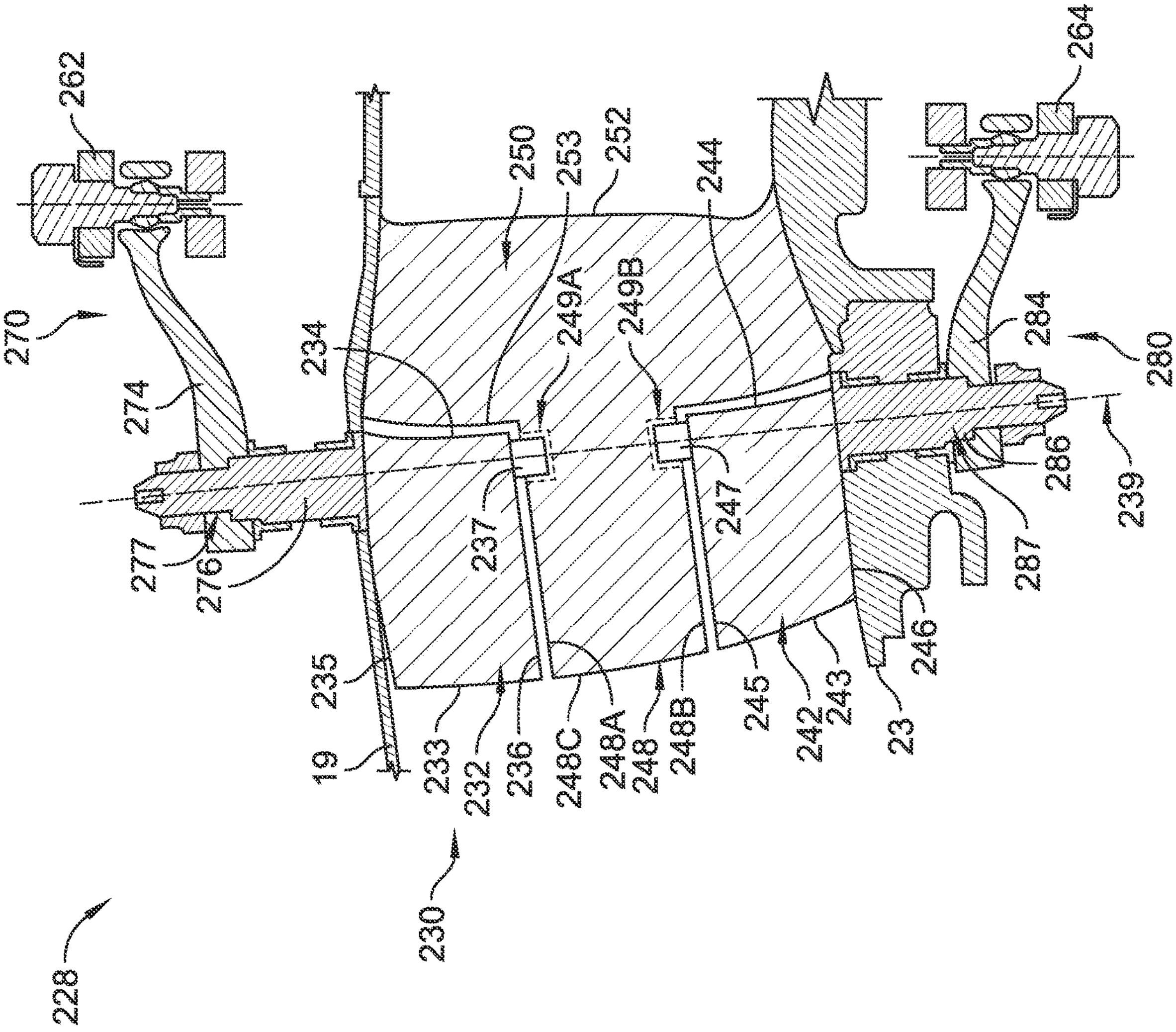
FIG. 13 is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion and a second actuation assembly arranged radially inward of the leading edge portion, and showing that the guide vane further includes a static central portion arranged radially between the first tip segment and the first hub segment.

Another embodiment of an outlet guide vane assembly 228 is shown in FIG. 13. The outlet guide vane assembly 228 is similar to the outlet guide vane assemblies 28, 128 shown in FIGS. 1-12 and described herein. Accordingly, similar reference numbers in the 200 series indicate features that are common between the outlet guide vane assembly 228 and the outlet guide vane assemblies 28, 128. The descriptions of the outlet guide vane assemblies 28, 128 are incorporated by reference to apply to the outlet guide vane assembly 228, except in instances when they conflict with the specific description and the drawings of the outlet guide vane assembly 228.

Similar to the outlet guide vane assembly 228 described above, the outlet guide vane assembly 228 includes first tip and hub segments 232, 242. In this embodiment, the first variable leading edge outlet guide vane 230 further includes a central portion 248 arranged between the first tip segment 232 and the first hub segment 242 such that the first tip segment 232 and the first hub segment 242 are radially spaced apart. In some embodiments, the central portion may be coupled to and extend axially away from the axially forward side 253 of the fixed aft portion 250. The central portion 248 is configured to be static and not rotate.

As can be seen in FIG. 13, the central portion 248 includes a radially outer side 248A, a radially inner side 248B, and an axially forward end 248C extending between the radially outer and inner sides 248A, 248B and partially defining the leading edge of the vane 230 along with the tip and hub segments 232, 242. The central portion 248 may further include a radially outer hinge rod receiving cavity 249A configured to receive a hinge rod 237 of tip segment 232, and a radially inner hinge rod receiving cavity 249B configured to receive a hinge rod 247 of hub segment 242. The central portion 248 may provide stability to the tip and hub segments 232, 242, as well as allow for uninterrupted flow over the central portion of the vane 230.

Figure 14:
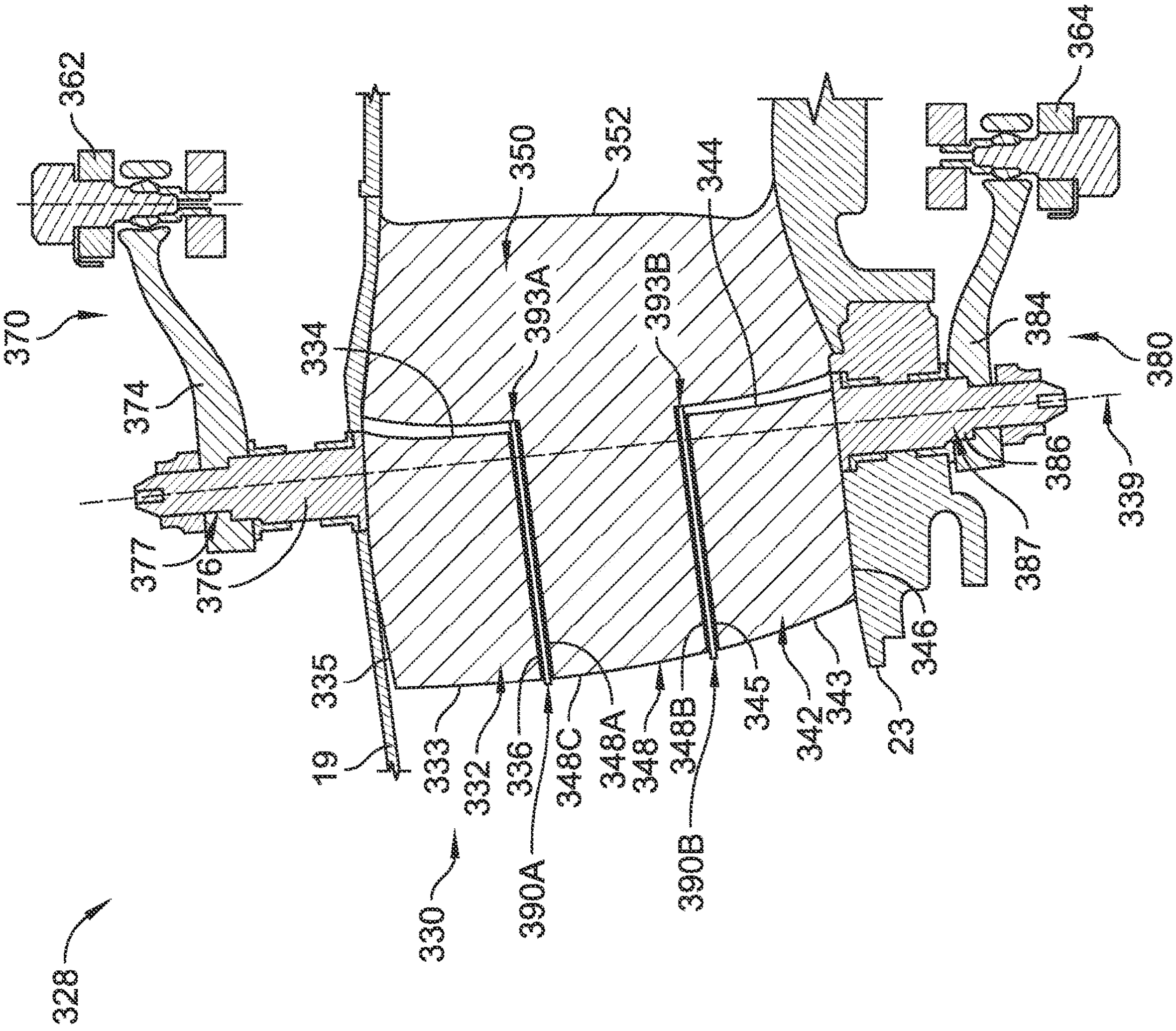
FIG. 14 is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion and a second actuation assembly arranged radially inward of the leading edge portion, showing that the guide vane further includes a static central portion arranged radially between the first tip segment and the first hub segment, and showing that the guide vane further includes air manipulating members arranged radially between the first tip segment and the central portion and between the first hub segment and the central portion.

Another embodiment of an outlet guide vane assembly 328 is shown in FIG. 14. The outlet guide vane assembly 328 is similar to the outlet guide vane assemblies 28, 128, 228 shown in FIGS. 1-13 and described herein. Accordingly, similar reference numbers in the 300 series indicate features that are common between the outlet guide vane assembly 328 and the outlet guide vane assemblies 28, 128, 128, 228. The descriptions of the outlet guide vane assemblies 28, 128, 228 are incorporated by reference to apply to the outlet guide vane assembly 328, except in instances when they conflict with the specific description and the drawings of the outlet guide vane assembly 328.

Similar to the outlet guide vane assembly 228 described above, the outlet guide vane assembly 328 includes first tip and hub segments 332, 342 and a central portion 348. Unlike the outlet guide vane assembly 228, the outlet guide vane assembly 328 may include a single or multiple air manipulating members 390A, 390B arranged in the small radial gaps between the tip segment 332 and central portion 348 and between the hub segment 342 and central portion 348. The air manipulating members 390A, 390B may be formed similarly to the air manipulating member 190 described above, in particular formed as a seal or winglet.

In some embodiments, one of the air manipulating members 390A, 390B may be formed as a winglet while the other is formed as a seal. In some embodiments, both of the air manipulating members 390A, 390B are formed as a seal. In some embodiments, both of the air manipulating members 390A, 390B are formed as a winglet. In embodiments in which the tip and hub segments 332, 342 are rotationally attached to the central portion 348 via hinge rods similar to those described above, the air manipulating members 390A, 390B can include a cutout (not shown but similar to the cutout 198 shown in FIG. 11) to allow the hinge rods to pass therethrough. In other arrangements in which the tip and hub segments 332, 342 are entirely spaced apart from the central portion 348, similar to embodiment shown in FIG. 7, the cutout would not be necessary.

Figure 15:
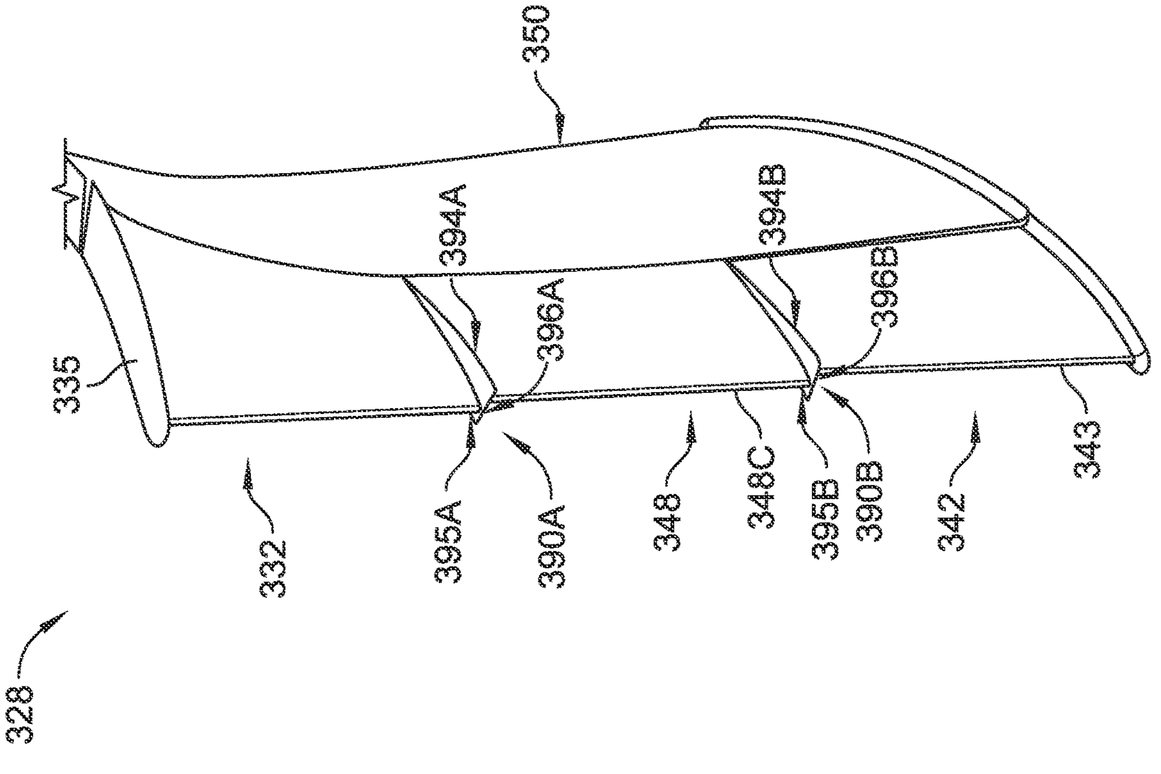
FIG. 15 is a perspective view of the first variable leading edge outlet guide vane of FIG. 14, showing the air manipulating members configured as a winglets.

As can be seen in FIG. 15, the forward edge 396A of the winglet 390A is long enough such that the pressure side edge 395A is located beyond the position of the tip segment 332 in the circumferential direction. Similarly, the forward edge 396B of the winglet 390B is long enough such that the suction side edge 394B is located beyond the position of the hub segment 342 in the circumferential direction. In some embodiments, the forward edges 396A, 396B are formed to be long enough such that both the suction and pressure side edges 394A, 394B, 395A, 395B are located outside of the potential range of pitch angle positions of the tip and hub segments 332, 342. This ensures that radial flows across the tip and hub segments 332, 342 will continue to be better matched at all pitch angle positions of the tip and hub segments 332, 342.

Another embodiment of an outlet guide vane assembly 428 is shown in FIGS. 16-19. The outlet guide vane assembly 428 is similar to the outlet guide vane assemblies 28, 128, 228, 328 shown in FIGS. 1-15 and described herein. Accordingly, similar reference numbers in the 400 series indicate features that are common between the outlet guide vane assembly 428 and the outlet guide vane assemblies 28, 128, 128, 228, 328. The descriptions of the outlet guide vane assemblies 28, 128, 228, 328 are incorporated by reference to apply to the outlet guide vane assembly 428, except in instances when they conflict with the specific description and the drawings of the outlet guide vane assembly 428.

Figure 16A:
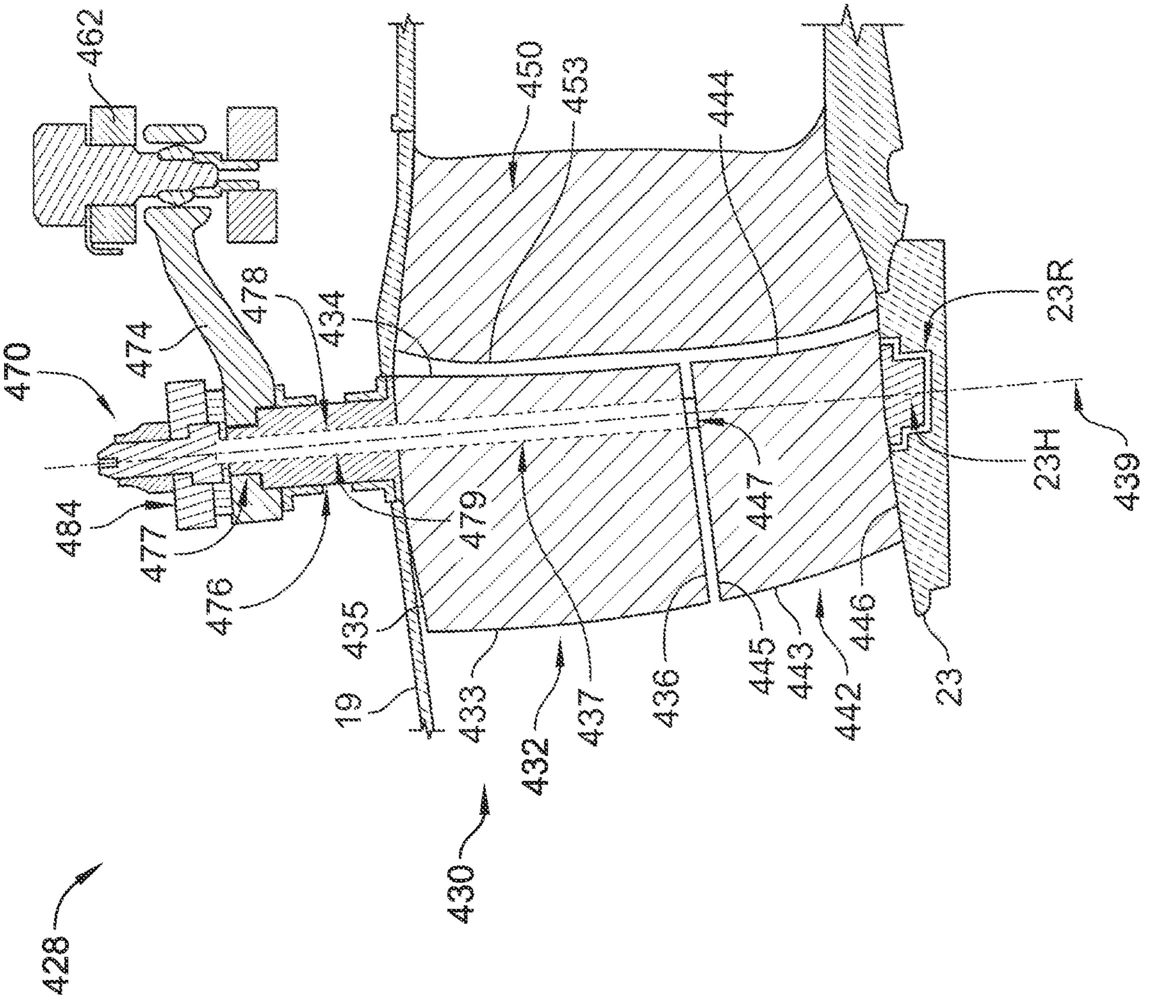
FIG. 16A is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion, and showing that the first actuation assembly includes a first actuation head coupled to the first tip segment so as to rotate the first tip segment, a second actuation head radially outward of the first actuation head, and a first actuation rod extending through the first actuation head from the second actuation head to the first hub segment so as to rotate the first hub segment.

Similar to the outlet guide vane assembly 28 described above, the outlet guide vane assembly 428 includes first tip and hub segments 432, 442. Unlike the vane assemblies 28, 128, 228, 328 described above, the vane assembly 428 only includes a single actuation assembly 470, in particular a first actuation assembly 470 as shown in FIG. 16A. The single actuation assembly 470 is configured to independently rotate both the first tip segment 432 and the first hub segment 442. As such, the first hub segment 442 is rotatably coupled to the inner wall 23 via a hub hinge 23H arranged within a hinge receptacle 23R formed in a radially outer side of the inner wall 23.

As can be seen in FIG. 16A, the first actuation assembly 470 is arranged radially outward of the leading edge portion 431, in particular radially outward of the radially outer side 435 of the first tip segment 432, and includes a first actuation head 476 coupled to the first tip segment 432, a second actuation head 484, and a first actuation rod 478 coupled to the second actuation head 484 and to the first hub segment 432.

Specifically, the first actuation head 476 has a first cavity 479 formed therethrough that is substantially similarly shaped to the outer surface of the first actuation rod 478. Similarly, the first tip segment 432 includes a second cavity 437 extending therethrough. The second cavity 437 is axially aligned with the first cavity 479, and in particular, both cavities 437, 479 are axially aligned with the leading edge pitch axis 439. As a result, as shown in FIG. 16A, the first actuation rod 478 can extend from the second actuation head 484, through the first cavity 479, through the second cavity 437, and couple to the radially outer side 445 of the first hub segment 442.

In this configuration, the first actuation head 476 is configured to selectively rotate the first tip segment 432 about the leading edge pitch axis 439 to a first pitch angle relative to the incoming fan exit air 15 utilizing similar actuation methodologies as described above, such as via the actuation arm 474 in conjunction with the annular ring 462, ring segments, or individual actuators. The second actuation head 484 is configured to selectively rotate the first hub segment 442 via rotation thereof, which rotates the first actuation rod 478 and thus the first hub segment 442. The first hub segment 442 is rotated independent of the first tip segment 432 about the leading edge pitch axis 439 to a second pitch angle relative to the incoming fan exit air 15. As such, the tip and hub segments 432, 442 can be rotated to the same or different pitch angles based on the design and operation requirements, such as the operating conditions, predetermined angles, and the like described above.

In some embodiments, the first actuation assembly 470 can further include an actuator coupled to the second actuation head 484 that is configured to rotate the second actuation head 484. In some embodiments, the actuator may be a relatively small hydraulic actuator or an electric motor actuator such as a stepper motor directly coupled to the second actuation head 484. In other embodiments, the second action head 484 may be actuated via similar means as to the first actuation head 476, such as via a further actuation arm coupled to an annular ring, ring segments, or individual actuators.

Figure 16B:
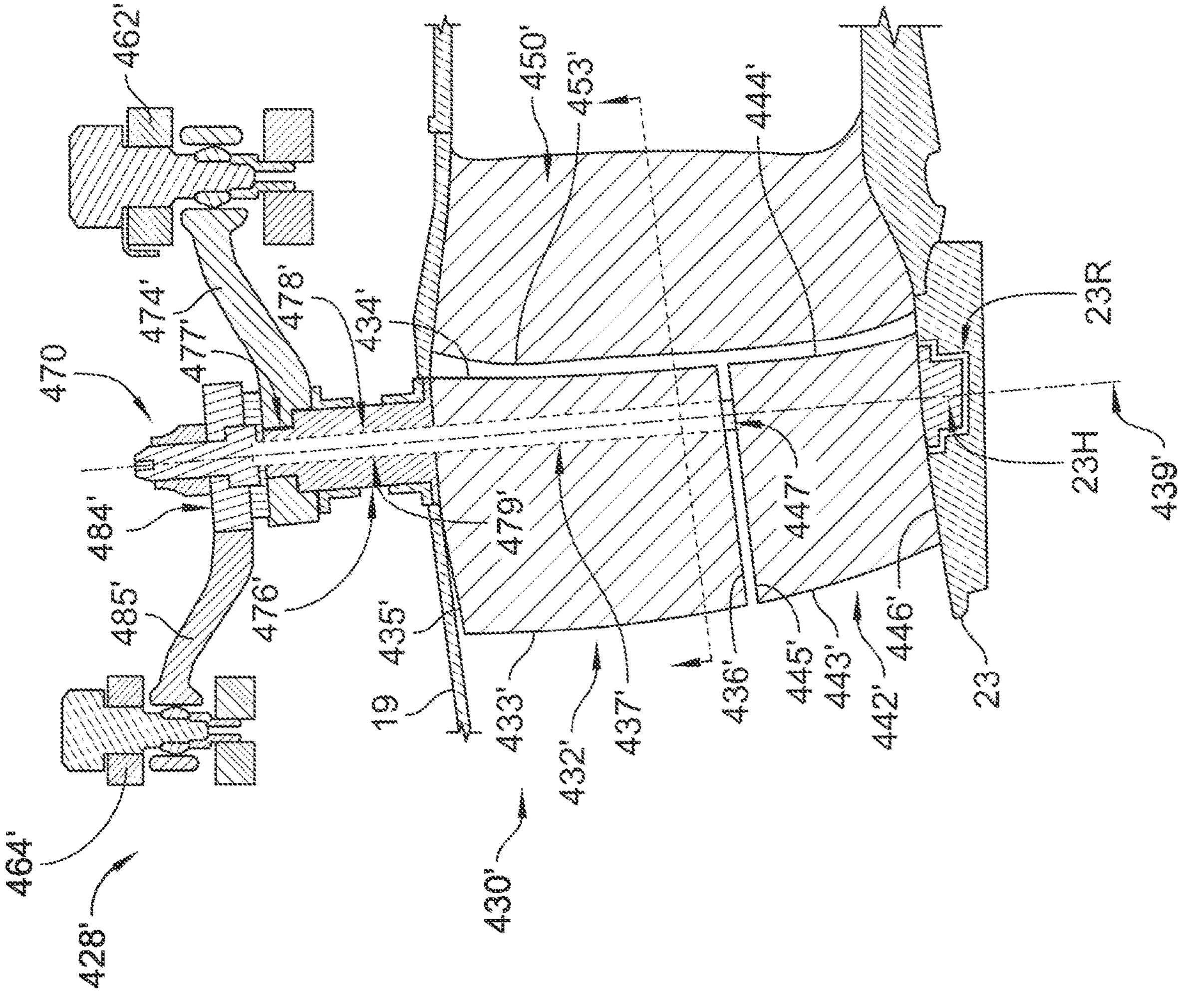
FIG. 16B is a side cross-sectional view of a first variable leading edge outlet guide vane of FIG. 16A, showing an alternative actuation arrangement of the second actuation head.

For example, as shown in the alternative actuation arrangement of the vane assembly 428' of FIG. 16B, in some embodiments, the second actuation head 484' is rotated via pivoting of a similar actuation arm 485' and annular ring 464' coupled thereto. The annular ring 464' may be fully annular or segmented. In such an embodiment, the actuation arm 485' extends axially forward opposite of the direction of extension of the actuation arm 474'. The annular ring 464' is arranged axially forward of the annular ring 462'.

Figure 16C:
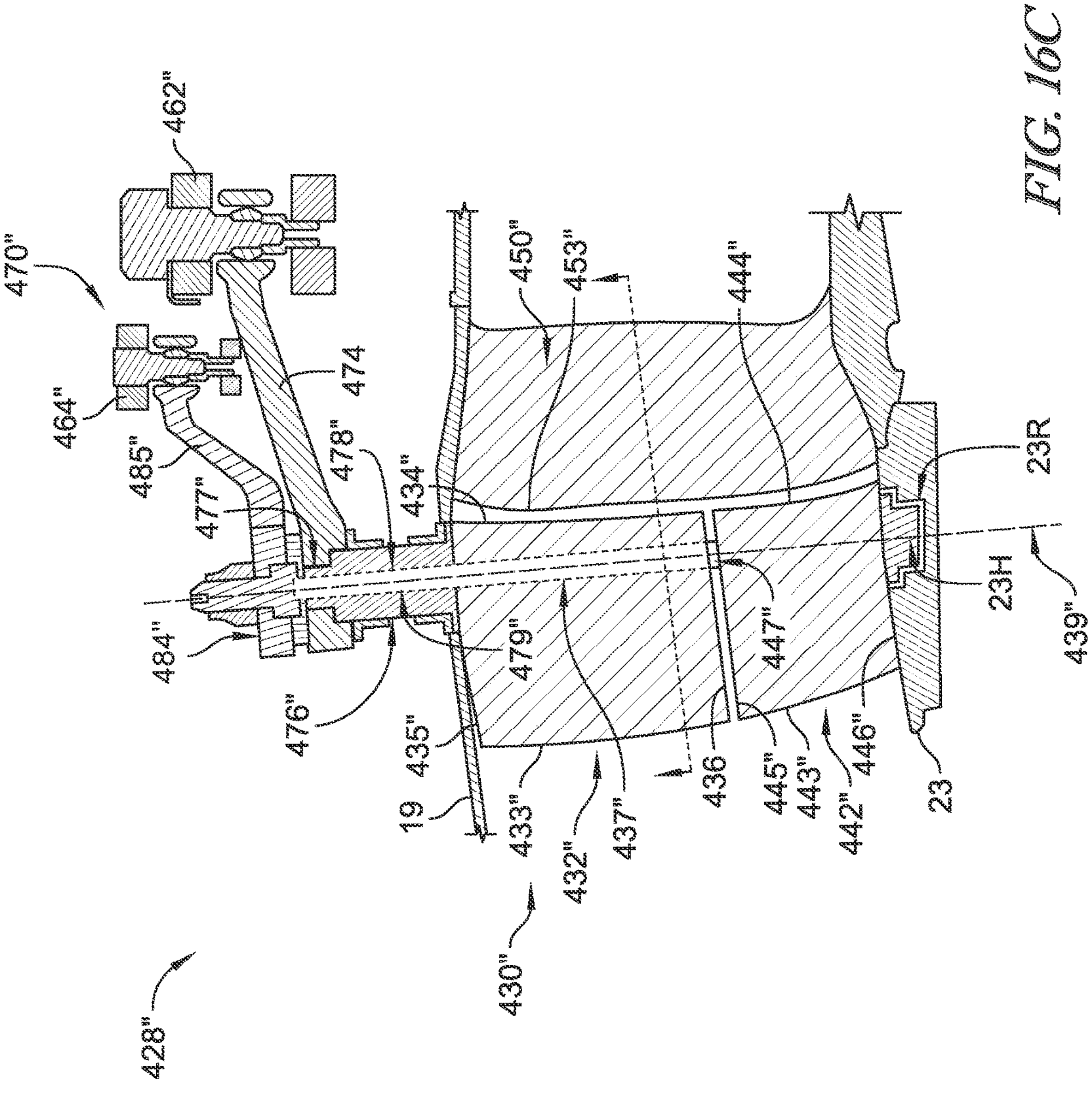
FIG. 16C is a side cross-sectional view of a first variable leading edge outlet guide vane of FIG. 16A, showing an alternative actuation arrangement of the second actuation head.

Similarly, as shown in the alternative actuation arrangement of the vane assembly 428" of FIG. 16C, in some embodiments, the second actuation head 484" is rotated via pivoting of a similar actuation arm 485" and annular ring 464" coupled thereto. The annular ring 464" may be fully annular or segmented. In such an embodiment, the actuation arm 485" extends axially aft in the same direction of extension of the actuation arm 474". The annular ring 464" is arranged radially outward of the annular ring 462", and may be axially forward of the annular ring 462", as shown in FIG. 16C. In some embodiments, it may be feasible to arrange the annular ring 464" axially aft of the annular ring 462".

Figure 17:
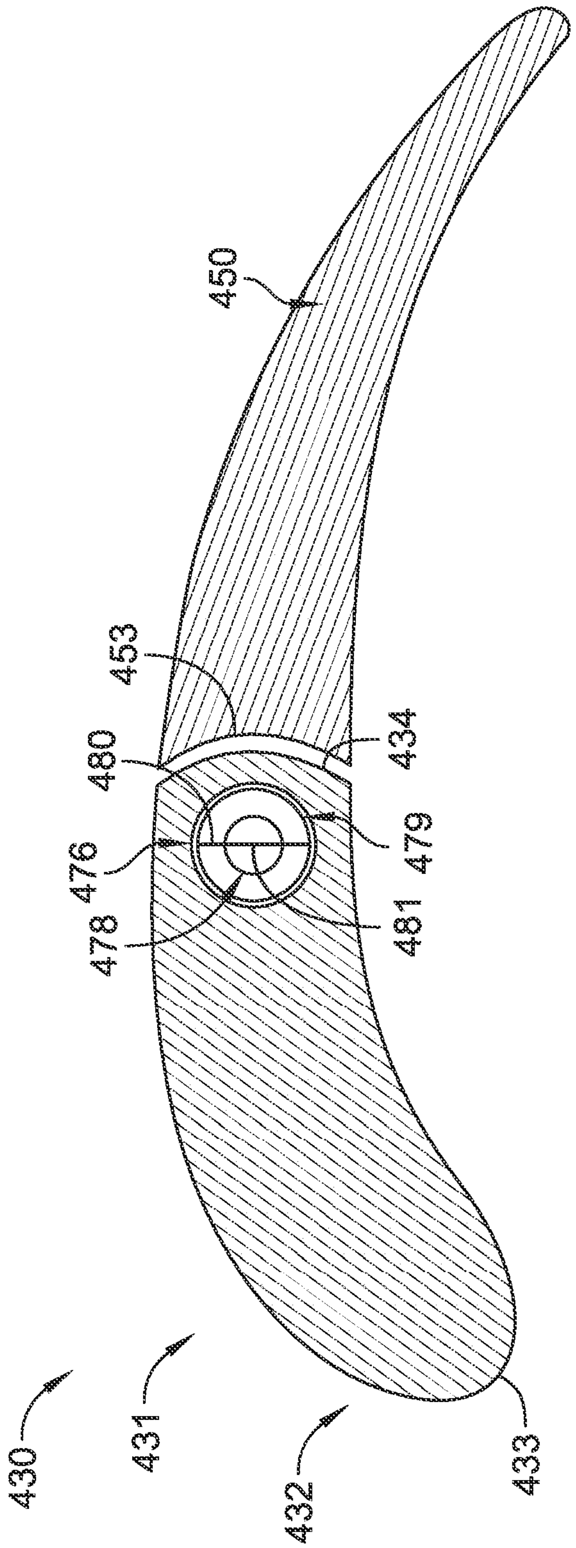
FIG. 17 is a top cross-sectional view of the first variable leading edge outlet guide vane of FIG. 16A, showing the first tip segment at a neutral position and the first actuation head and the actuation rod.
Figure 18:
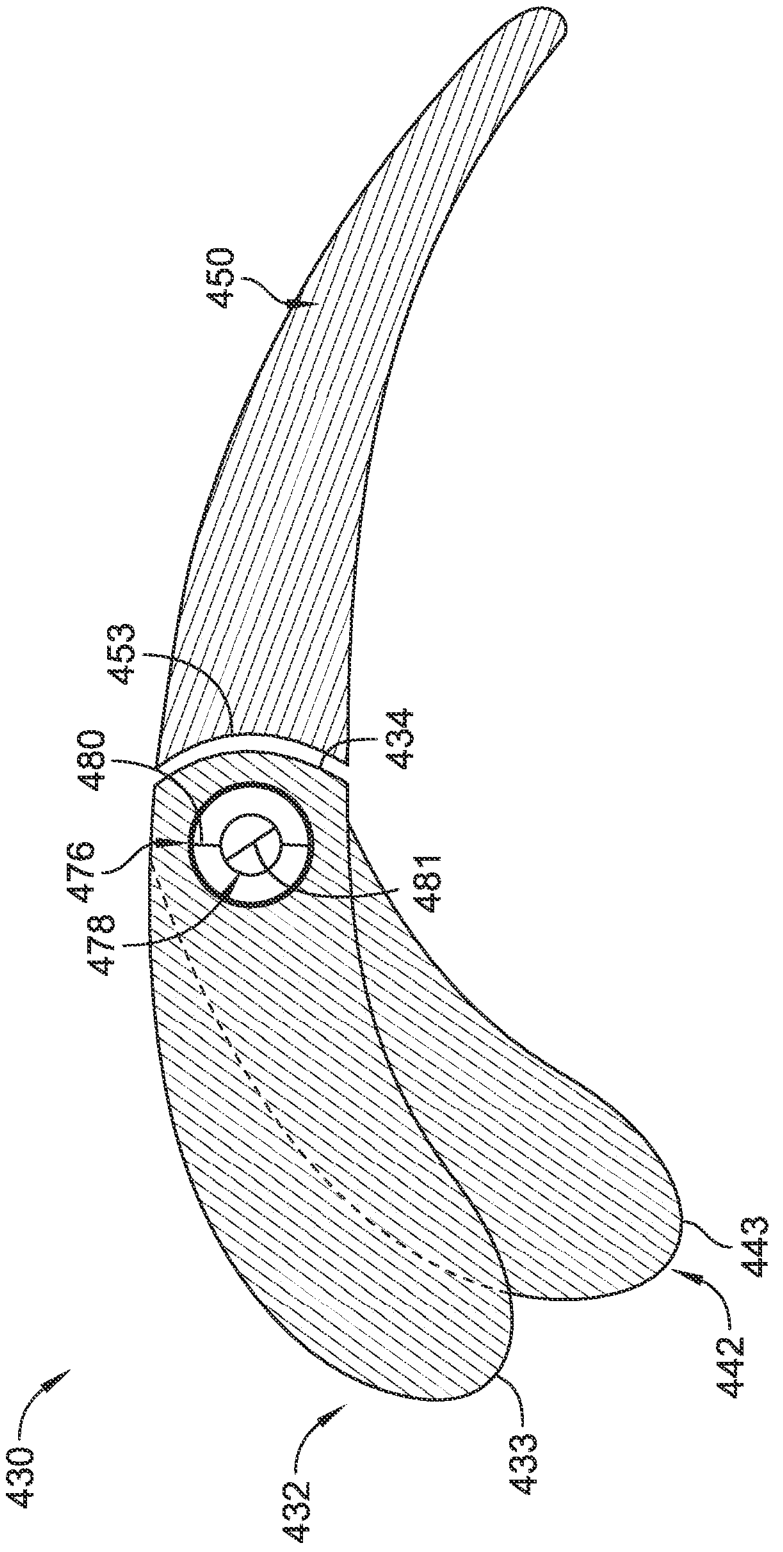
FIG. 18 is a top cross-sectional view of the first variable leading edge outlet guide vane of FIG. 16A, showing the first tip segment at a neutral position and the first hub segment rotated to a pitch angle.
Figure 19:
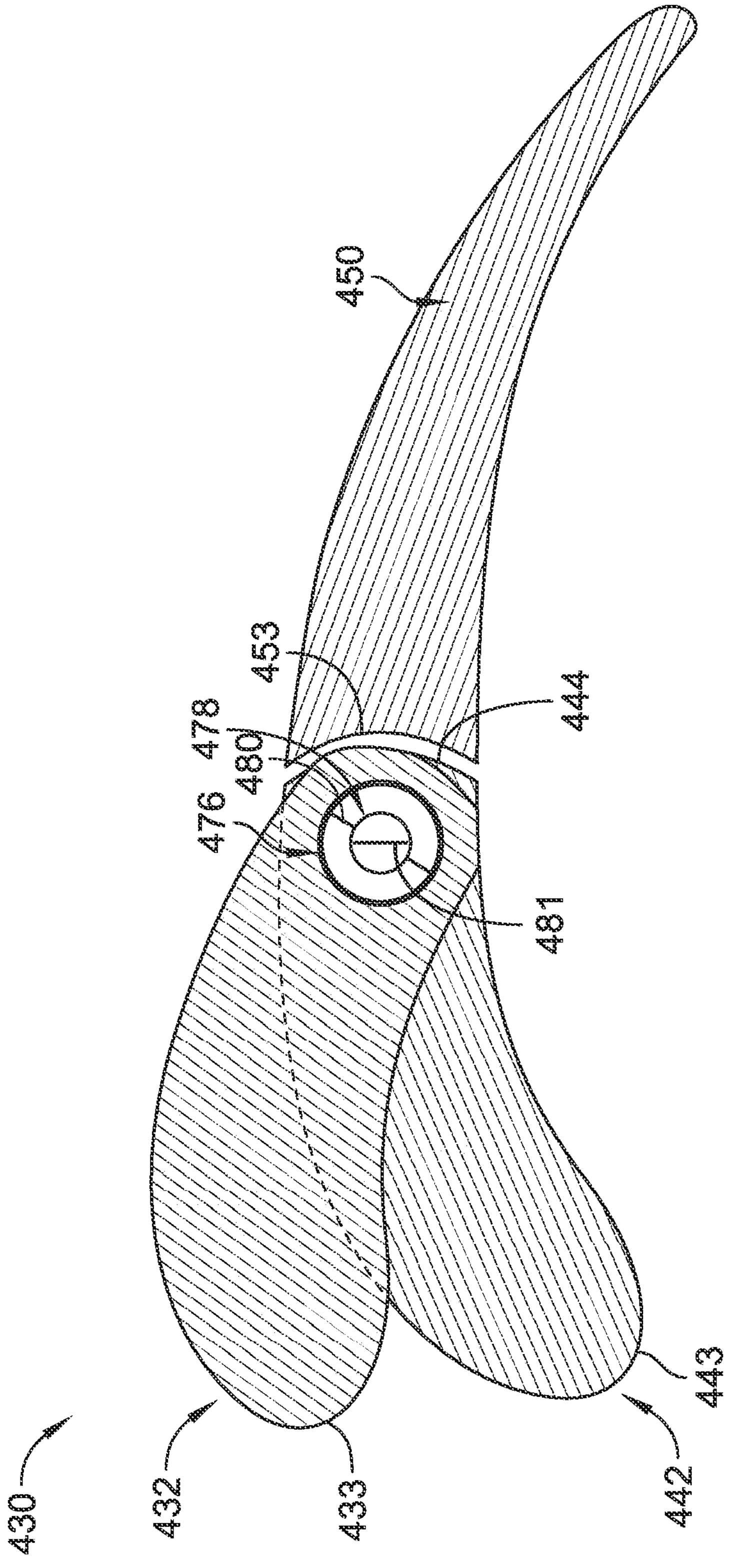
FIG. 19 is a top cross-sectional view of the first variable leading edge outlet guide vane of FIG. 16A, showing the first hub segment at a neutral position and the first tip segment rotated to a pitch angle.

As shown in FIG. 17, the diameter of the first cavity 479 formed in the first actuation head 476 is smaller than the overall diameter of the first actuation head 476. For reference, FIG. 17 shows a rotation indicator 480 for the first actuation head 476 and a rotation indicator 481 for the first actuation rod 478. Using these indicators 480, 481, the relative rotation of the first actuation head 476 and the first actuation rod 478 can be visualized. For example, FIG. 17 shows the indicators 480, 481 aligned with each other such that the first tip and hub segments 432, 442 are at a neutral, zero-angle position. FIG. 18 shows the first hub segment 442 rotated to a first pitch angle while the first tip segment 432 remains at a neutral position, which can be seen by the offset in the indicators 480, 481. FIG. 19 shows the first tip segment 432 rotated to a first pitch angle while the first hub segment 442 remains at a neutral position, which can be seen by the offset in the indicators 480, 481.

Figure 20:
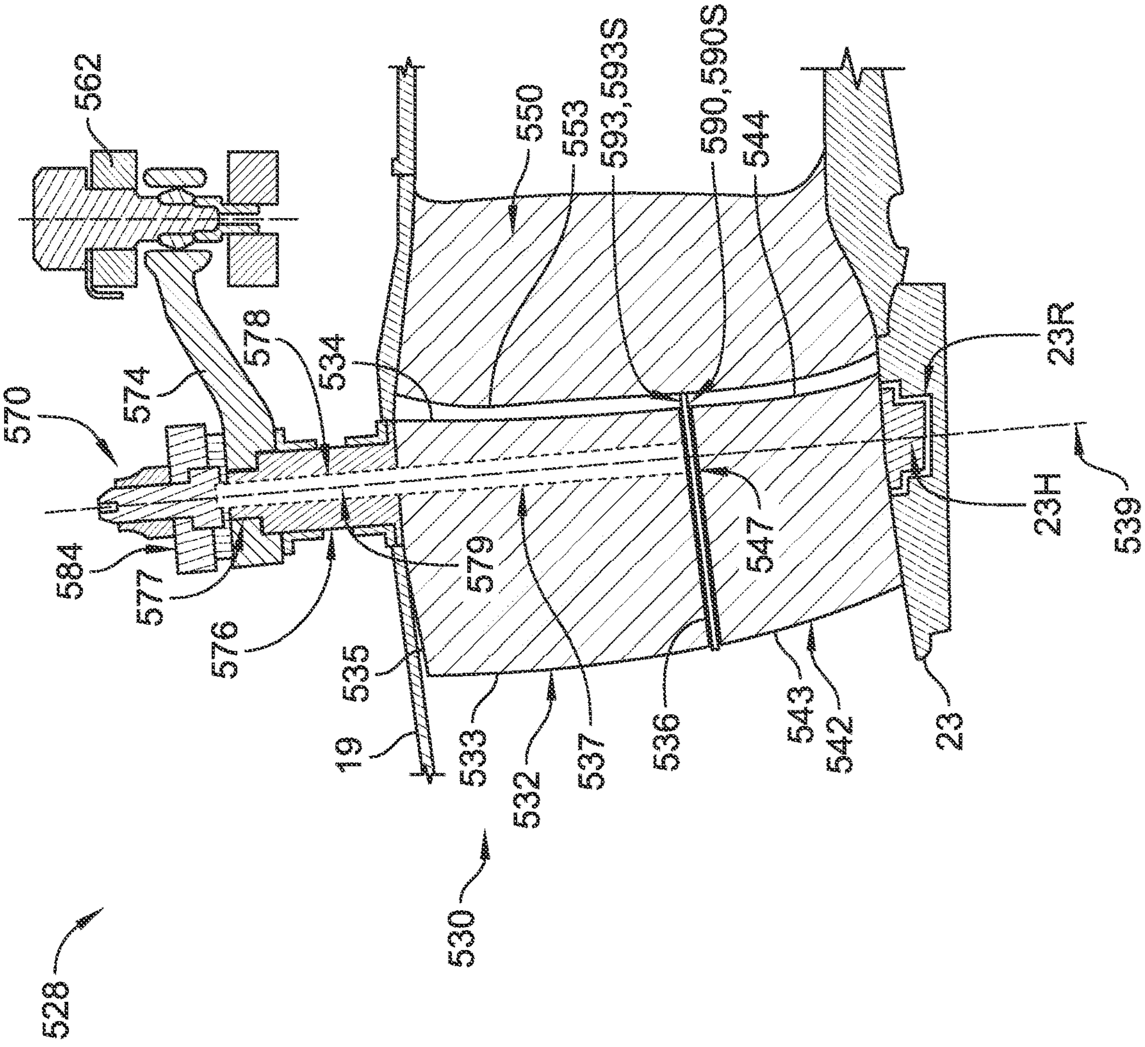
FIG. 20 is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion, showing that the first actuation assembly includes a first actuation head coupled to the first tip segment so as to rotate the first tip segment, a second actuation head radially outward of the first actuation head, and a first actuation rod extending through the first actuation head from the second actuation head to the first hub segment so as to rotate the first hub segment, and showing that the guide vane further includes a first air manipulating member arranged radially between the first tip segment and the first hub segment.

Another embodiment of an outlet guide vane assembly 528 is shown in FIG. 20. The outlet guide vane assembly 528 is similar to the outlet guide vane assemblies 28, 128, 228, 328, 428 shown in FIGS. 1-19 and described herein. Accordingly, similar reference numbers in the 500 series indicate features that are common between the outlet guide vane assembly 528 and the outlet guide vane assemblies 28, 128, 228, 328, 428. The descriptions of the outlet guide vane assemblies 28, 128, 228, 328, 428 are incorporated by reference to apply to the outlet guide vane assembly 528, except in instances when they conflict with the specific description and the drawings of the outlet guide vane assembly 528.

Similar to the outlet guide vane assembly 428 described above, the outlet guide vane assembly 528 includes first tip and hub segments 532, 542 and a single actuation assembly 570 configured to move both tip and hub segments 532, 542. In some embodiments, the first actuation assembly 570 can include the first actuation arm 574, as well as an actuator coupled to the second actuation head 584 that is configured to rotate the second actuation head 584. In some embodiments, the actuator may be a relatively small hydraulic actuator or an electric motor actuator such as a stepper motor directly coupled to the second actuation head 584. In other embodiments, the second actuation head 584 may be actuated via similar means as to the first actuation head 576, and similar means as the section actuation head 484, such as via a further actuation arm coupled to an annular ring, ring segments, or individual actuators, such as those shown in FIG. 16B and FIG. 16C.

In this embodiment, an air manipulating member 590 similar to the air manipulating members 190, 390A, 390B described above may be arranged in the small radial gap between the first tip and hub segments 532, 542. In particular, in some embodiments, the air manipulating member 590 may be configured as a winglet 590 or platform coupled to an axially forward side 553 of the fixed aft portion 550. In other embodiments, the air manipulating member 590 may be configured as a seal 590S.

Similar to the air manipulating member 190, the air manipulating member 590 may be configured as a winglet 590 that reduce radial flows across the tip and hub segments 532, 542. Also similar to the air manipulating member 190, the air manipulating member 590 may be configured as a seal 590S which is coupled to the axially forward side 553 of the fixed aft portion 550 or directly coupled to one of the radially inner side 536 of the tip segment 532 or the radially outer side 545 of the hub segment 542.

Figure 21:
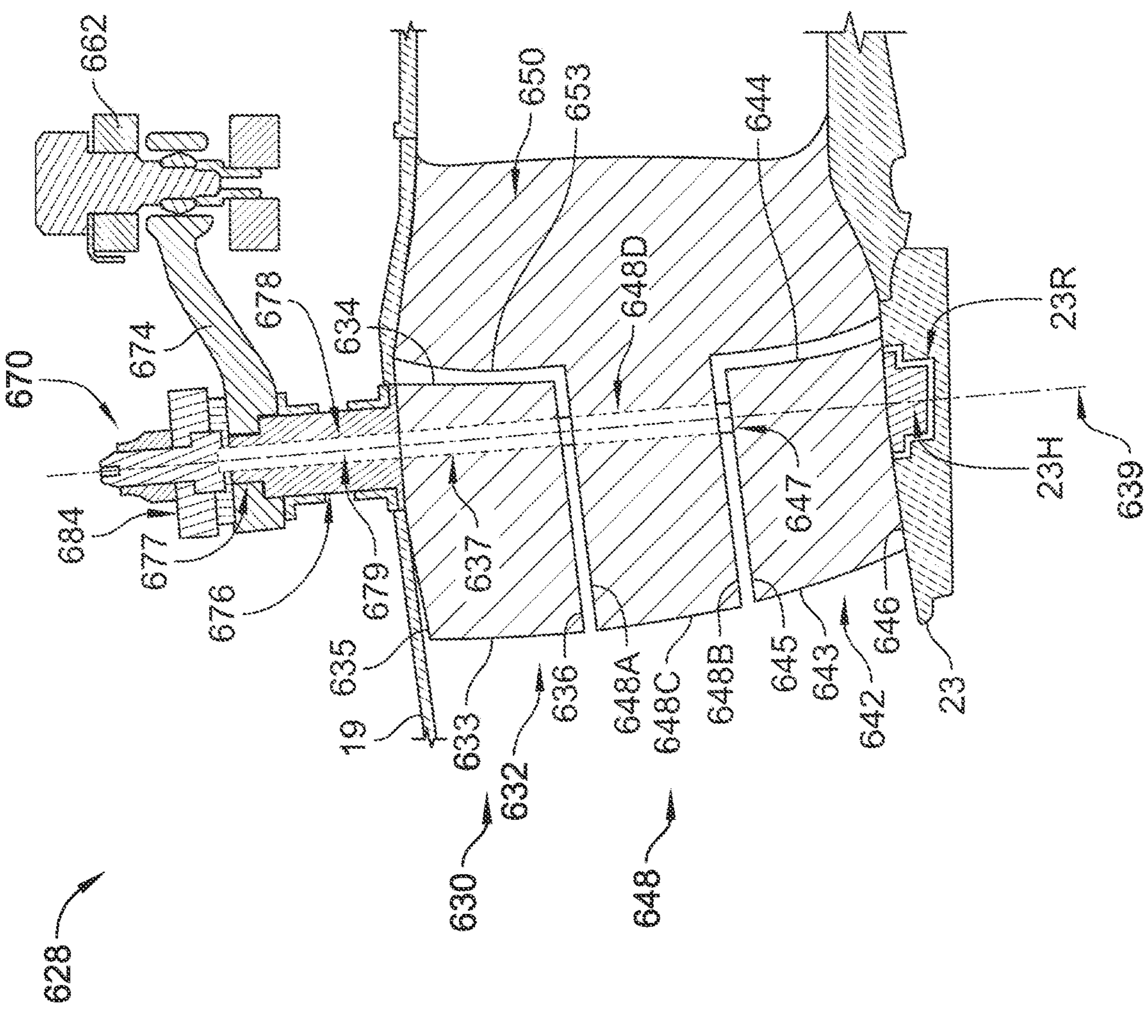
FIG. 21 is a side cross-sectional view of a first variable leading edge outlet guide vane according to a further aspect of the present disclosure, showing that the first variable leading edge outlet guide vane includes a first tip segment and a first hub segment, showing that the outlet guide vane assembly includes a first actuation assembly arranged radially outward of the leading edge portion, showing that the first actuation assembly includes a first actuation head coupled to the first tip segment so as to rotate the first tip segment, a second actuation head radially outward of the first actuation head, and a first actuation rod extending through the first actuation head from the second actuation head to the first hub segment so as to rotate the first hub segment, and showing that the guide vane further includes a static central portion arranged radially between the first tip segment and the first hub segment.

Another embodiment of an outlet guide vane assembly 628 is shown in FIG. 21. The outlet guide vane assembly 628 is similar to the outlet guide vane assemblies 28, 128, 228, 328, 428, 528 shown in FIGS. 1-20 and described herein. Accordingly, similar reference numbers in the 600 series indicate features that are common between the outlet guide vane assembly 628 and the outlet guide vane assemblies 28, 128, 228, 328, 428, 528. The descriptions of the outlet guide vane assemblies 28, 128, 228, 328, 428, 528 are incorporated by reference to apply to the outlet guide vane assembly 628, except in instances when they conflict with the specific description and the drawings of the outlet guide vane assembly 628.

Similar to the outlet guide vane assembly 428 described above, the outlet guide vane assembly 628 includes first tip and hub segments 632, 642 and a single actuation assembly 670 configured to move both tip and hub segments 632, 642. In some embodiments, the first actuation assembly 670 can include the first actuation arm 674, as well as an actuator coupled to the second actuation head 684 that is configured to rotate the second actuation head 684. In some embodiments, the actuator may be a relatively small hydraulic actuator or an electric motor actuator such as a stepper motor directly coupled to the second actuation head 684. In other embodiments, the second actuation head 684 may be actuated via similar means as to the first actuation head 676, and similar means as the section actuation head 484, such as via a further actuation arm coupled to an annular ring, ring segments, or individual actuators, such as those shown in FIG. 16B and FIG. 16C.

In this embodiment, the first variable leading edge outlet guide vane 630 further includes a central portion 648 arranged between the first tip segment 632 and the first hub segment 642 such that the first tip segment 632 and the first hub segment 642 are radially spaced apart. In some embodiments, the central portion 648 may be coupled to and extend axially away from the axially forward side 653 of the fixed aft portion 650.

As can be seen in FIG. 21, the central portion 648 includes a radially outer side 648A, a radially inner side 648B, and an axially forward end 648C extending between the radially outer and inner sides 648A, 648B and partially defining the leading edge of the vane 630 along with the tip and hub segments 632, 642. The central portion 648 may further include a radially extending third cavity 648D that is axially aligned with the second cavity 637 and the first cavity 679 formed in the first actuation head 676. As such, the first actuation rod 678 can extend from the second actuation head 684, through the first actuation head 676, through the first tip segment 632, through the central portion 648, and couple to the radially outer side 645 of the hub segment 642 such that the second actuation head 684 can rotate the hub segment 642. The central portion 648 may provide stability to the tip and hub segments 632, 642, as well as allow for uninterrupted flow over the central portion of the vane 630.

Figure 22:
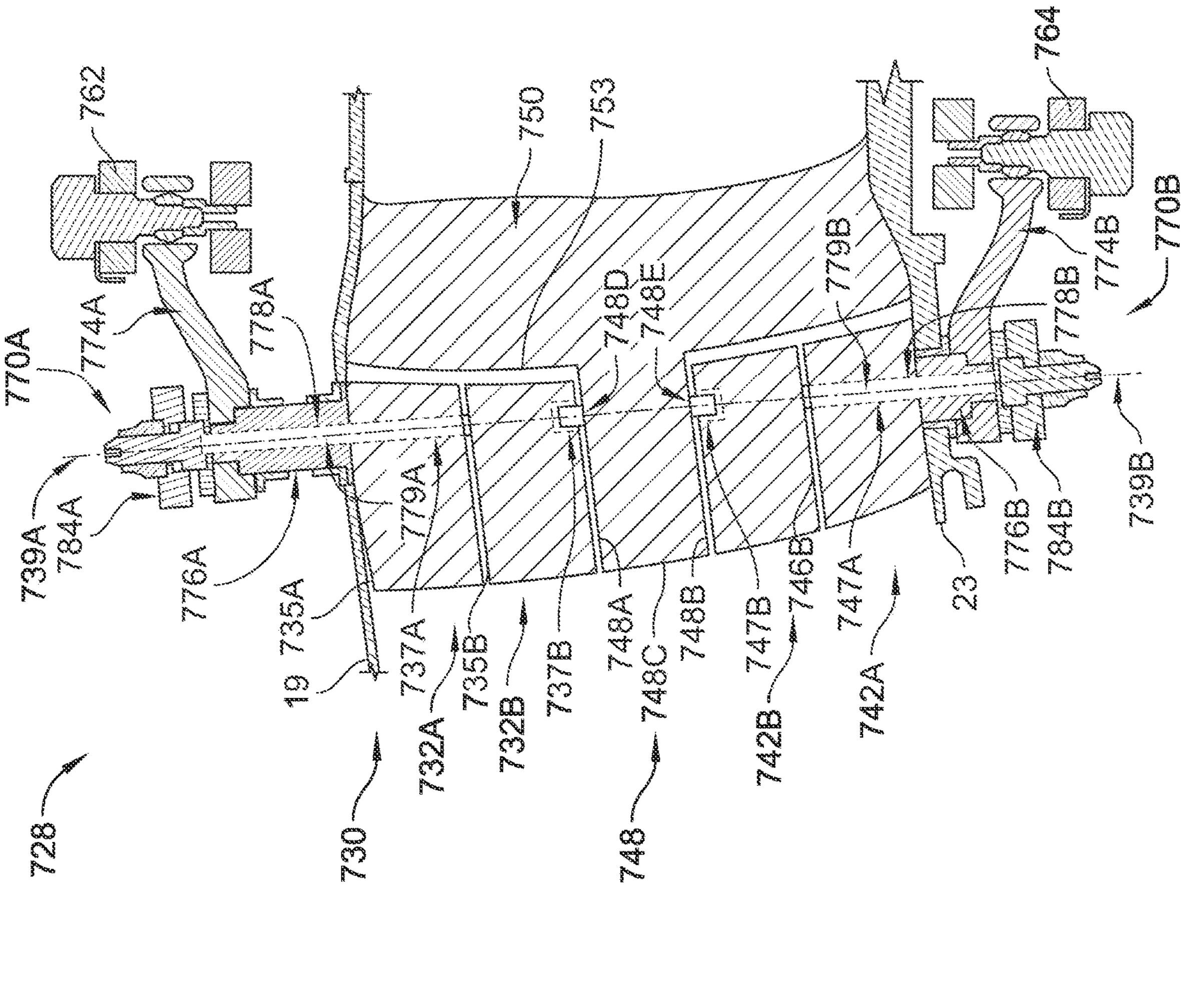
FIG. 22 is a side cross-sectional view of a first variable leading edge outlet guide vane according to a further aspect of the present disclosure, showing that the first variable leading edge outlet guide vane includes first and second tip segments and first and second hub segments, showing that the outlet guide vane assembly includes a first actuation assembly including a first actuation head coupled to the first tip segment, a second actuation head, and a first actuation rod extending through the first actuation head from the second actuation head to the second tip segment so as to rotate the second tip segment, showing that the outlet guide vane assembly includes a second actuation assembly including a third actuation head coupled to the first hub segment, a fourth actuation head, and a second actuation rod extending through the third actuation head from the fourth actuation head to the second hub segment so as to rotate the second hub segment, and showing that the guide vane further includes a static central portion arranged radially between the first tip segment and the first hub segment.

Another embodiment of an outlet guide vane assembly 728 is shown in FIG. 22. The outlet guide vane assembly 728 is similar to the outlet guide vane assemblies 28, 128, 228, 328, 428, 528, 628 shown in FIGS. 1-21 and described herein. Accordingly, similar reference numbers in the 700 series indicate features that are common between the outlet guide vane assembly 728 and the outlet guide vane assemblies 28, 128, 228, 328, 428, 528, 628. The descriptions of the outlet guide vane assemblies 28, 128, 228, 328, 428, 528, 628 are incorporated by reference to apply to the outlet guide vane assembly 728, except in instances when they conflict with the specific description and the drawings of the outlet guide vane assembly 728.

Similar to the outlet guide vane assemblies 528, 628 described above, the outlet guide vane assembly 728 includes first tip and hub segments 732A, 742A and a central portion 748. Unlike the assemblies described above, the outlet guide vane assembly 728 further includes a second tip segment 732B and a second hub segment 742B arranged radially between the first tip segment 732A and the central portion 748 and between the first hub segment 742A and the central portion 748, respectively. The additional second tip segment 732B and second hub segment 742B allow for additional variations of the fan exit air 15 flowing over the vane 730.

In order to move all four segments 732A, 732B, 742A, 742B, the assembly 728 includes a first actuation assembly 770A and a second actuation assembly 770B that may be configured substantially similarly to each other. For example, the first actuation head 776A of the first actuation assembly 770A has a first cavity 779A formed therethrough. Similarly, the first tip segment 732A includes a second cavity 737A extending therethrough. The second cavity 737A is axially aligned with the first cavity 779A. As a result, as shown in FIG. 22, the first actuation rod 778A of the first actuation assembly 770A can extend from the second actuation head 784A, through the first cavity 779A, through the second cavity 737A, and couple to the radially outer side 735B of the second tip segment 732B. As such, the second actuation head 784A can rotate the second tip segment 732B independent of the first tip segment 732A, which is rotated by the first actuation head 776A.

Similarly, the first actuation head 776B of the second actuation assembly 770B has a first cavity 779B formed therethrough. Similarly, the first hub segment 742A includes a second cavity 747A extending therethrough. The second cavity 747A is axially aligned with the first cavity 779B. As a result, as shown in FIG. 22, the first actuation rod 778B of the second actuation assembly 770B can extend from the second actuation head 784B, through the first cavity 779B, through the second cavity 747A, and couple to the radially inner side 746B of the second hub segment 742B. As such, the second actuation head 784B can rotate the second hub segment 742B independent of the first hub segment 742A, which is rotated by the first actuation head 776B. The central portion 748 can further include hinge rods 748D, 748E extending away from its radially outer and inner sides 748A, 748B, respectively, which are received in hinge rod receiving cavities 737B, 747B of the second tip and hub segments 732B, 742B, respectively.

Each actuation rod 778A, 778B has a central axis. In some embodiments, due to the curvature of the leading edge of the leading edge portion 31, the central axes of the actuation rods 778A, 778B may need to be offset to accommodate the curvature and the offset leading edge pitch axes 739A, 739B of the various segments. For example, as shown in FIG. 22, the first hub segment 742A may have a leading edge pitch axis 739B offset from the leading edge pitch axis 739A of the three radially outer segments 732A, 732B, 742B. As such, the actuation rod 778B of the second actuation assembly 770B must be aligned with the leading edge pitch axis 739B so as to effectively rotate the first hub segment 742A. In other embodiments, however, the curvature of the leading edge may not have as great of an effect, and both actuation rods 778A, 778B can be aligned with a singular leading edge pitch axis 739A that all four segments 732A, 732B, 742A, 742B rotate about.

Figure 23:
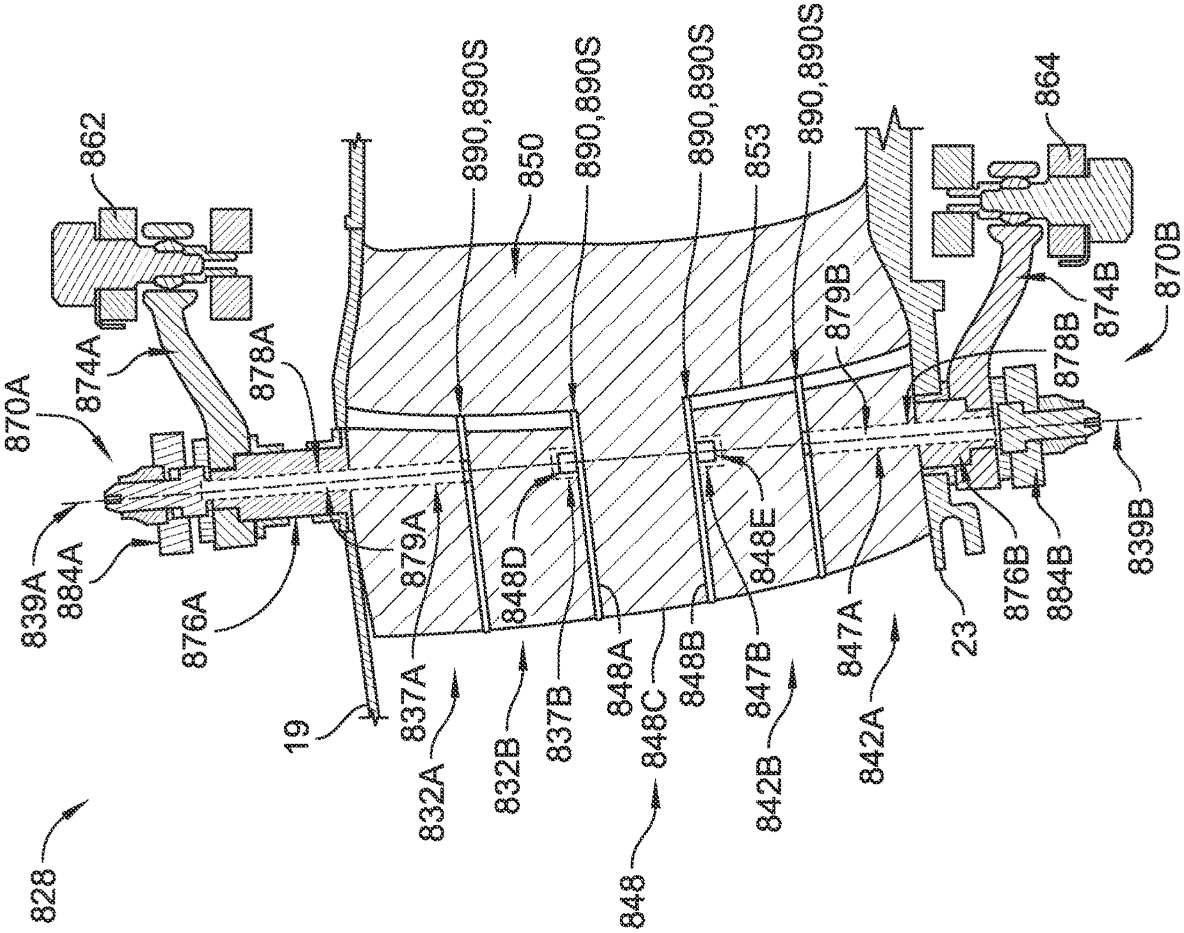
FIG. 23 is a side cross-sectional view of a first variable leading edge outlet guide vane according to a further aspect of the present disclosure, showing that the first variable leading edge outlet guide vane includes first and second tip segments and first and second hub segments, showing that the outlet guide vane assembly includes a first actuation assembly including a first actuation head coupled to the first tip segment, a second actuation head, and a first actuation rod extending through the first actuation head from the second actuation head to the second tip segment so as to rotate the second tip segment, showing that the outlet guide vane assembly includes a second actuation assembly including a third actuation head coupled to the first hub segment, a fourth actuation head, and a second actuation rod extending through the third actuation head from the fourth actuation head to the second hub segment so as to rotate the second hub segment, showing that the guide vane further includes a static central portion arranged radially between the first tip segment and the first hub segment, and showing that air manipulating members arranged radially between the tip and hub segments.
Figure 24:
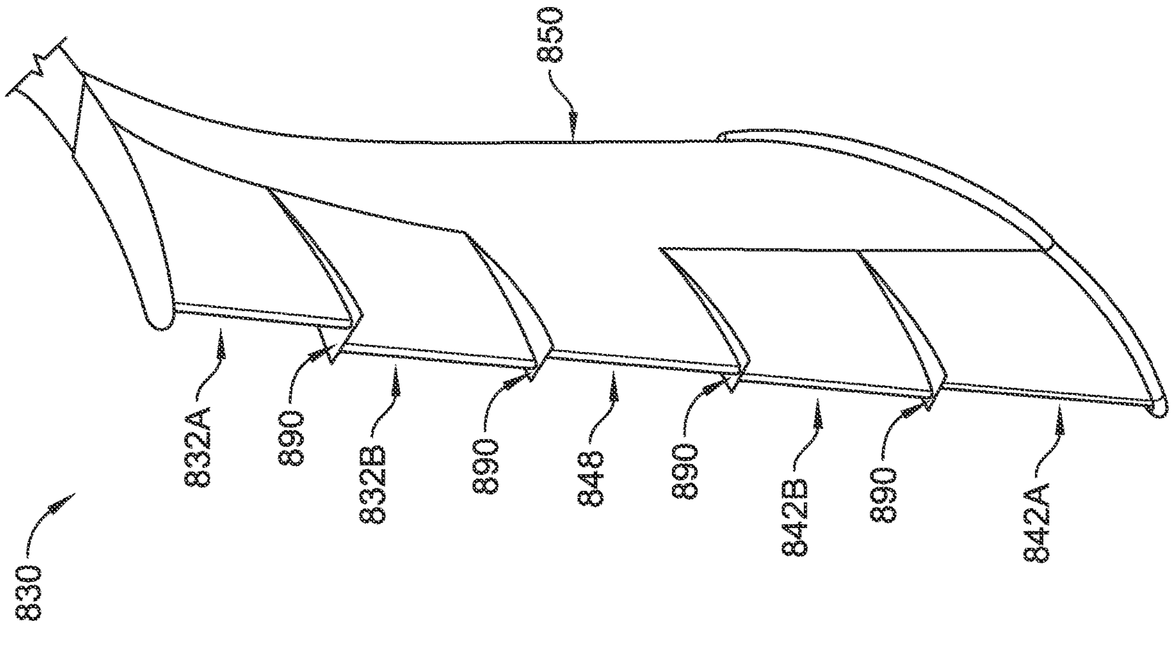
FIG. 24 is a perspective view of the first variable leading edge outlet guide vane of FIG. 23, showing the air manipulating members configured as a winglets.

Another embodiment of an outlet guide vane assembly 828 is shown in FIG. 23 and FIG. 24. The outlet guide vane assembly 828 is similar to the outlet guide vane assemblies 28, 128, 228, 328, 428, 528, 628, 728 shown in FIGS. 1-22 and described herein. Accordingly, similar reference numbers in the 800 series indicate features that are common between the outlet guide vane assembly 828 and the outlet guide vane assemblies 28, 128, 228, 328, 428, 528, 628, 728. The descriptions of the outlet guide vane assemblies 28, 128, 228, 328, 428, 528, 628, 728 are incorporated by reference to apply to the outlet guide vane assembly 828, except in instances when they conflict with the specific description and the drawings of the outlet guide vane assembly 828.

Similar to the outlet guide vane assembly 728 described above, the outlet guide vane assembly 828 includes first and second tip and hub segments 832A, 832B, 842A, 842B, a central portion 848, and two actuation assemblies 870A, 870B configured to move the first and second tip and hub segments 832A, 832B, 842A, 842B independently of each other. In this embodiment, an air manipulating member 890 similar to the air manipulating members 190, 390A, 390B, 590 described above may be arranged in the small radial gaps between the first and second tip and hub segments 832A, 832B, 842A, 842B and between the second tip and hub segments 832B, 842B and the central portion 848. In particular, in some embodiments, the air manipulating members 890 may be configured as a winglets 890 or platforms coupled to an axially forward side 853 of the fixed aft portion 850. In other embodiments, the air manipulating members 890 may be configured as seals 890S.

Similar to the air manipulating members 190, 390A, 390B, 590, the air manipulating members 890 may be configured as winglet 890 that reduce radial flows across the first and second tip and hub segments 832A, 832B, 842A, 842B, as shown in FIG. 24. Also similar to the air manipulating members 190, 390A, 390B, 590, the air manipulating member 890 may be configured as seals 890S coupled to the axially forward side 853 of the fixed aft portion 850 or directly coupled to one of the sides 836A, 836B, 845A, 845B of the first and second tip and hub segments 832A, 832B, 842A, 842B.

Figure 25:
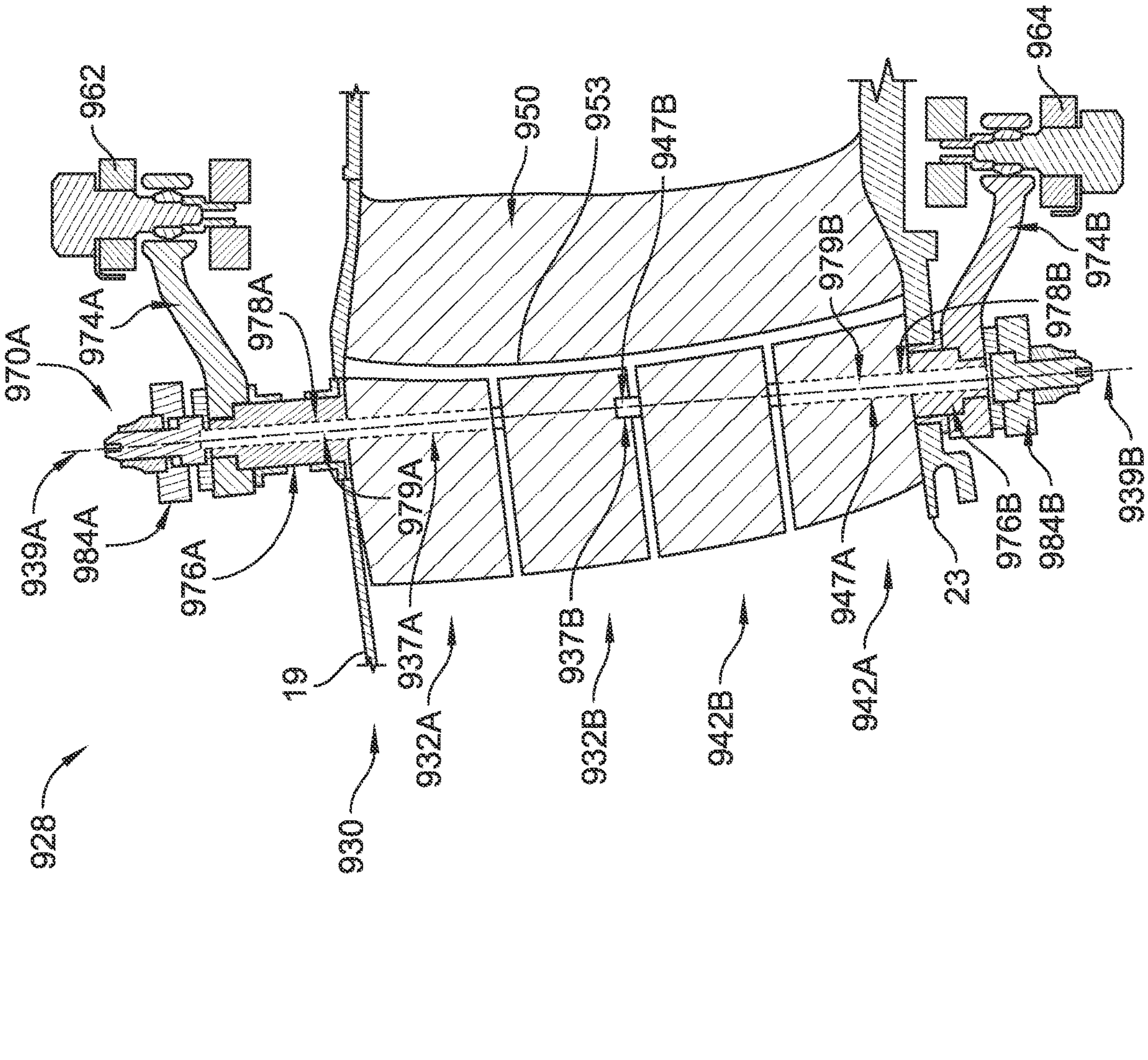
FIG. 25 is a side cross-sectional view of a first variable leading edge outlet guide vane according to a further aspect of the present disclosure, showing that the first variable leading edge outlet guide vane includes first and second tip segments and first and second hub segments, showing that the outlet guide vane assembly includes a first actuation assembly including a first actuation head coupled to the first tip segment, a second actuation head, and a first actuation rod extending through the first actuation head from the second actuation head to the second tip segment so as to rotate the second tip segment, showing that the outlet guide vane assembly includes a second actuation assembly including a third actuation head coupled to the first hub segment, a fourth actuation head, and a second actuation rod extending through the third actuation head from the fourth actuation head to the second hub segment so as to rotate the second hub segment, and showing that the guide vane does not include a static central portion arranged radially between the first tip segment and the first hub segment.

Another embodiment of an outlet guide vane assembly 928 is shown in FIG. 25. The outlet guide vane assembly 928 is similar to the outlet guide vane assemblies 28, 128, 228, 328, 428, 528, 628, 728, 828 shown in FIGS. 1-24 and described herein. Accordingly, similar reference numbers in the 900 series indicate features that are common between the outlet guide vane assembly 928 and the outlet guide vane assemblies 28, 128, 228, 328, 428, 528, 628, 728, 828. The descriptions of the outlet guide vane assemblies 28, 128, 228, 328, 428, 528, 628, 728, 828 are incorporated by reference to apply to the outlet guide vane assembly 928, except in instances when they conflict with the specific description and the drawings of the outlet guide vane assembly 928.

Similar to the outlet guide vane assembly 728 described above, the outlet guide vane assembly 928 includes first and second tip and hub segments 932A, 932B, 942A, 942B and two actuation assemblies 970A, 970B configured to move the first and second tip and hub segments 932A, 932B, 942A, 942B independently of each other. Unlike the outlet guide vane assembly 728, the vane assembly 928 does not include a central portion 948. As such, the second hub segment 942B can include a hinge rod 947 extending radially away from the segment 942B and received in a hinge rod receiving cavity 937B of the second tip segment 932B.

It should be appreciated that features and elements of all of the embodiments described above can be used in conjunction with alternative embodiments that would be understood by one of ordinary skill in the art. For example, a vane having three rotatable segments could be configured that includes two radially outer segments that are movable via an actuation assembly similar to the single actuation assembly 470 described above and a single radially inner segment movable via a second actuation assembly. Or, more than four segments may be utilized in a vane arrangement. Such similar alternative embodiments are contemplated by the present disclosure.

Figure 26:
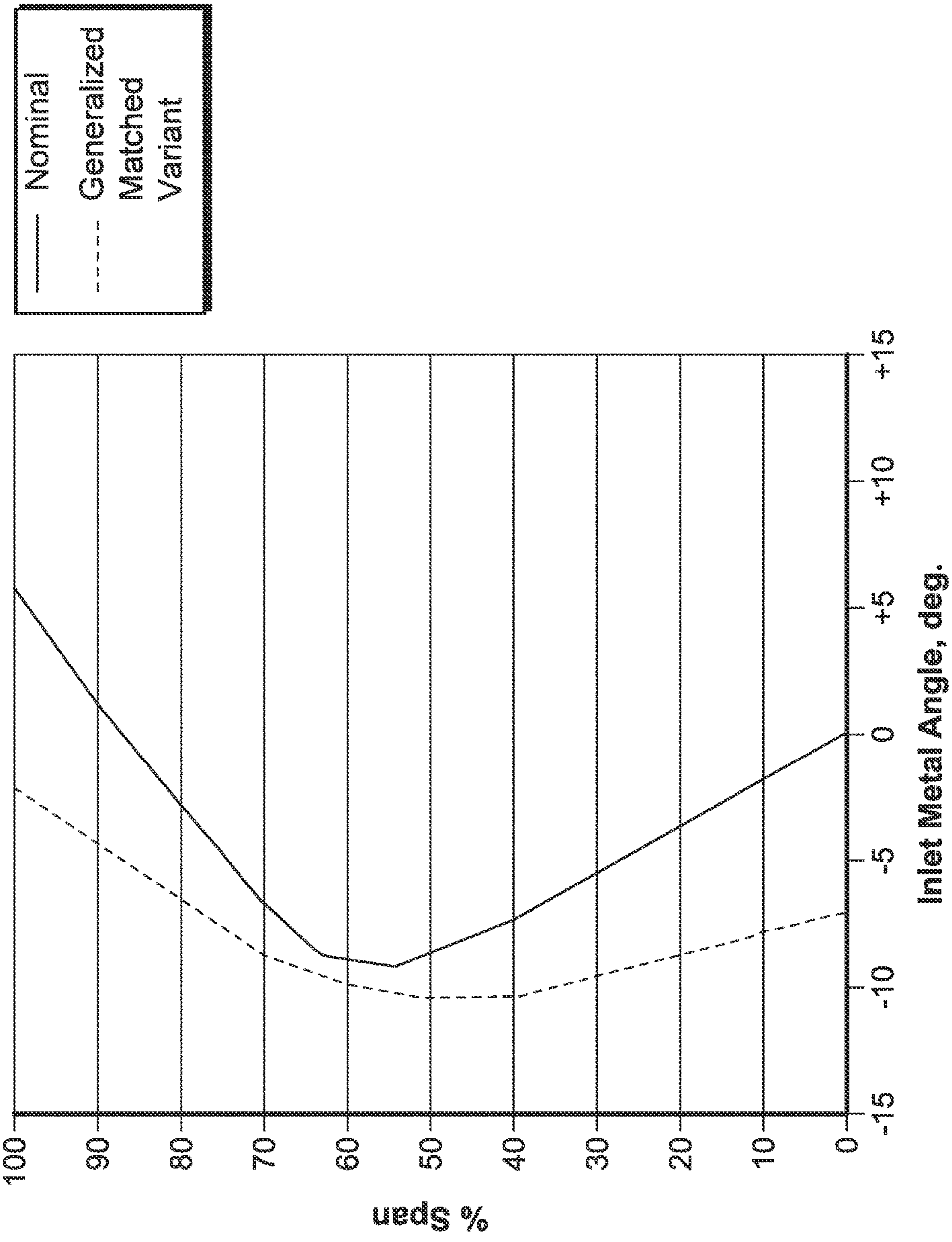
FIG. 26 is a graph showing distribution of span percentage versus inlet segment angle for a generalized matched vane versus a nominal vane according to the present disclosure.
Figure 27:
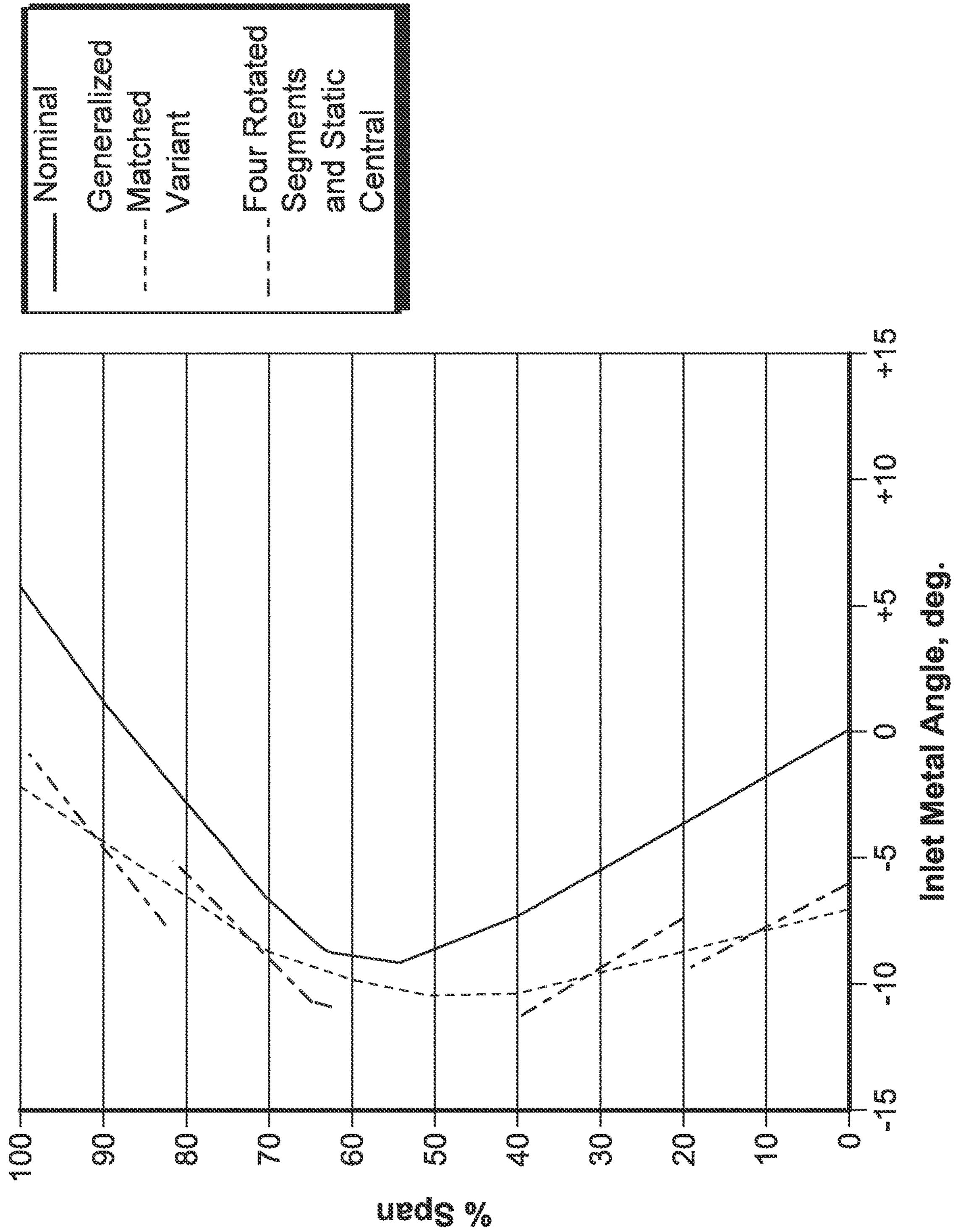
FIG. 27 is a graph showing span percentage versus inlet segment angle for rotation of a split nominal vane to resemble variant distributions for a variant vane assembly according to the present disclosure, including four segments and a static central portion.
Figure 28:
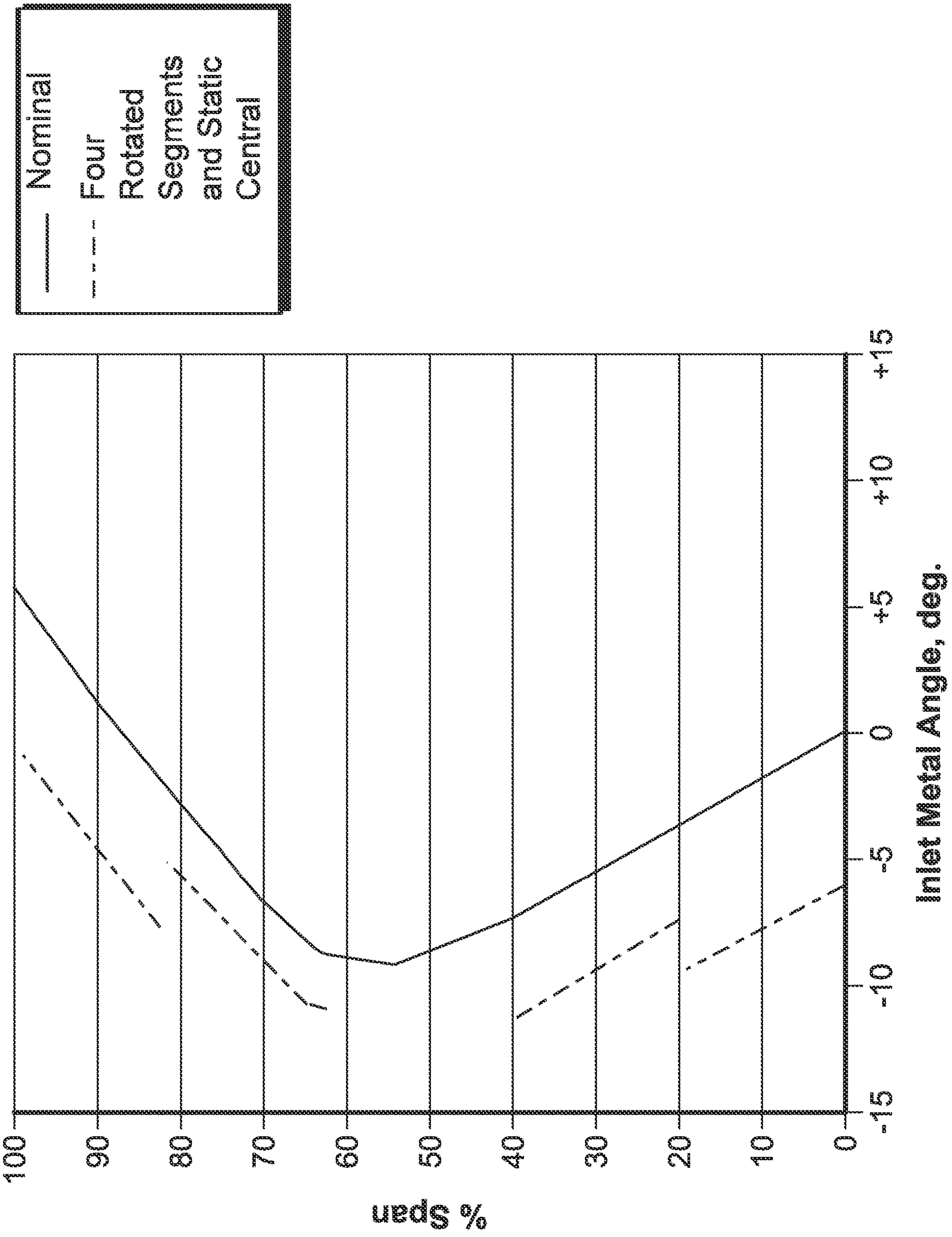
FIG. 28 is a graph showing span percentage versus inlet segment angle for a nominal vane and rotated segments of the nominal vane for a four segment vane assembly with a static central portion according to the present disclosure.
Figure 29:
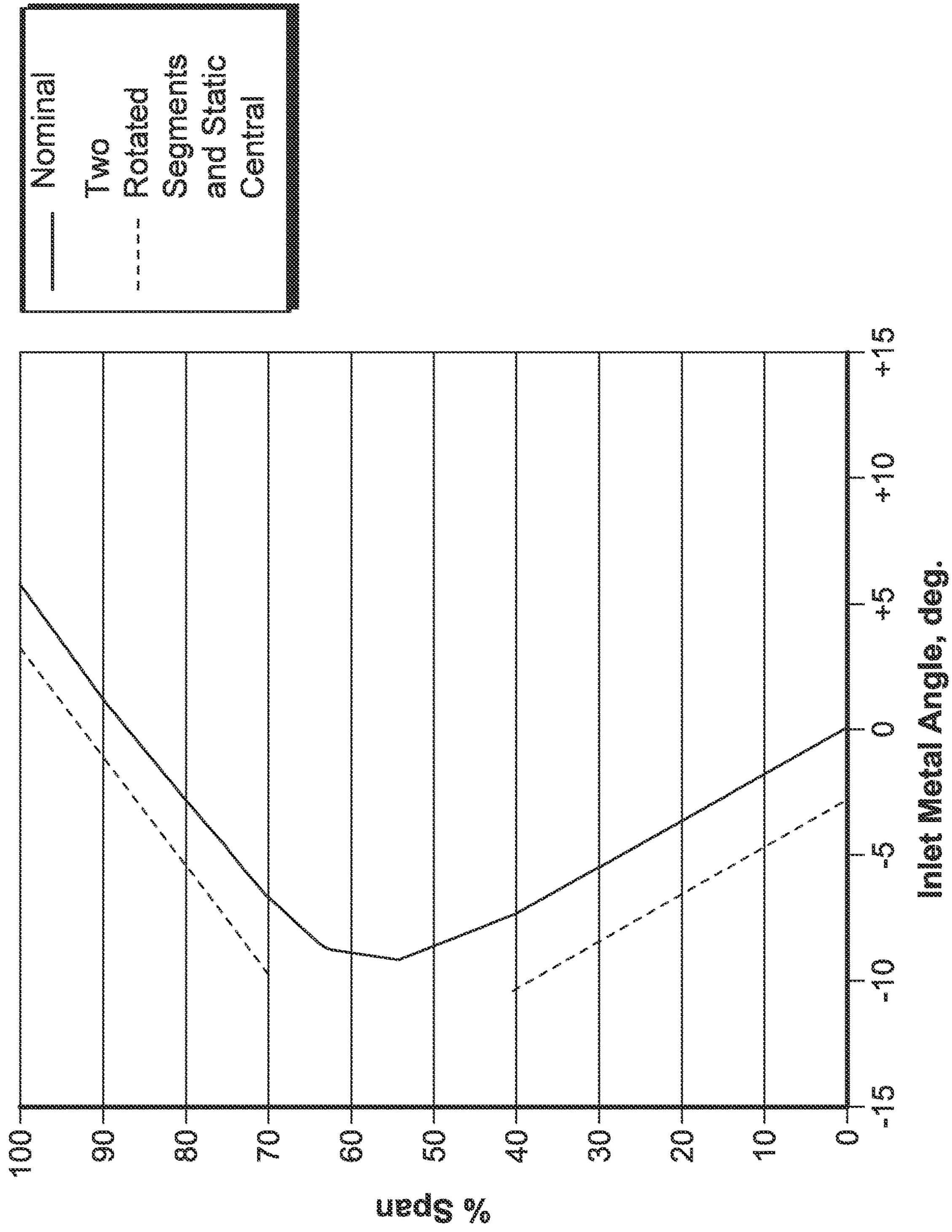
FIG. 29 is a graph showing span percentage versus inlet segment angle for a generalized section variation for a two segment vane assembly having a static central portion according to the present disclosure.
Figure 30:
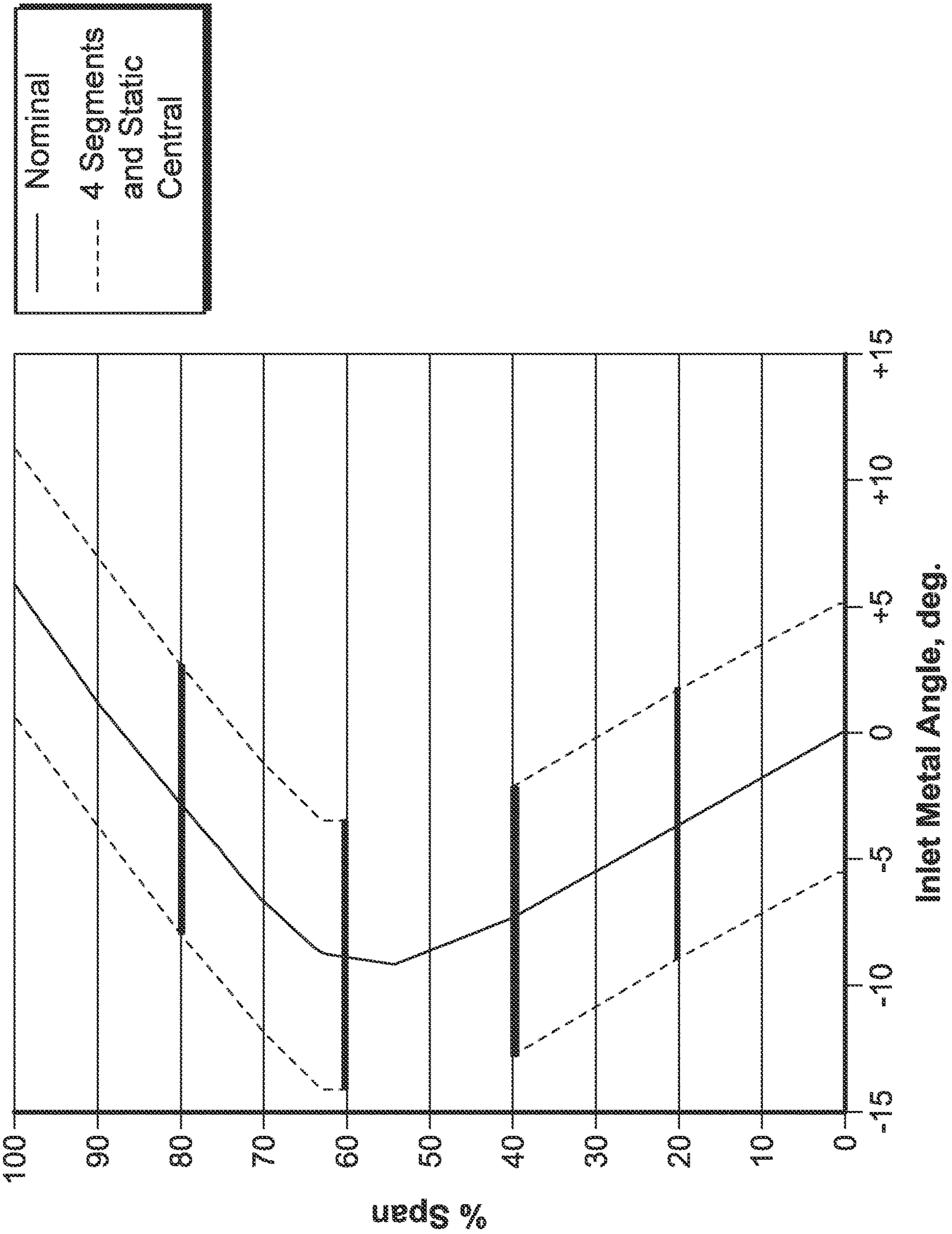
FIG. 30 is a graph showing span percentage versus inlet segment angle for a generalized section variation for a four segment vane assembly having a static central portion according to the present disclosure.

FIGS. 26-30 are graphs showing nominal and variation profiles of a particular outlet guide vane including four moveable segments and a static central portion, such as the embodiments shown in FIGS. 22-24. The graphs show span percentage versus inlet vane angle in degrees, with negative degrees indicating the vane profile is more open and positive degrees indicating the vane profile is more closed. The profiles shown in FIG. 26 are of a nominal vane versus a generalized matched vane. FIGS. 27, 28, and 30 are related to a particular outlet guide vane including four moveable segments and a static central portion, while the profiles shown in FIG. 29 are related to a particular outlet guide vane including two moveable segments and a static central portion.

The nominal vane cannot be varied, but each of the segmented vane's segments may be rotated so that the distribution of the segmented vane resembles the variation profile. FIG. 27 displays the variant distribution versus rotated segmented portions of the nominal profile to resemble the variant distribution. FIG. 28 displays the rotated segments of FIG. 27 but removes the variant distribution of FIG. 27. It is noted that the nominal and variant distribution are nearest to each other at approximately mid-span, around 50% to 70%. This may be true of other variant distributions where they are near the nominal or could cross so therefore it is logical that the static portion of the vane be at such a spanwise location. Additionally, the largest incidence delta from nominal may occur at the hub or tip which results in the most benefit for adjusting the leading edge angle would be here instead of midspan. The shift to around 60% rather than purely midspan for the center of the static portion also makes sense as the area is greater at higher spans compared to inner spans, this would be a beneficial approach for maintaining flow. A balance between flow requirements and incidence reduction must be considered for the segmented vane versus the nominal vane.

Moreover, as can be seen in FIGS. 26-28, the variations may be within 5 degrees opened or closed (i.e. not a large setting change), which is meaningful in terms of stall or performance. It is also possible to achieve a segmented vane to be within 3 degrees. These values would make it possible to have the winglets described above at the inner ends of segments to help avoid discontinuities between segments. FIG. 29 shows a two-segment vane having a static central portion, where the vane segments are rotated to closely adhere to the variation profile. FIG. 30 shows another four segment and static central portion vane over the span, with variations possible within 5 degrees open (negative) or closed (positive). The control system 90 can be configured to maintain overall choke margin even with different circumferential extents varying tip and hub segments by various degrees to match their setting angles to inlet flows.

A method can include arranging a fan duct 20 circumferentially around a central axis 11, providing a fan 21 comprising a plurality of fan blades 22 that extend radially outward relative to the central axis 11 and that are adapted to rotate about the central axis 11 to force fan exit air 15 toward an aft end of the fan duct 20, and arranging an outlet guide vane assembly 28 in the fan duct 20 axially downstream of the fan and configured to adjust a direction of incoming fan exit air 15 received from the plurality of fan blades 22 and reduce incidence between the outlet guide vane assembly 28 and the fan exit air 15, the outlet guide vane assembly 28 including a first variable leading edge outlet guide vane 30, a first actuation assembly 70 arranged radially outward of a leading edge portion 31 of the first variable leading edge outlet guide vane 30, and a second actuation assembly 80 arranged radially inward of the leading edge portion 31, the first variable leading edge outlet guide vane 30 extending radially relative to the central axis 11 and including the leading edge portion 31 and a fixed aft portion 50, the leading edge portion 31 including a first tip segment 32 configured to rotate about a leading edge pitch axis 39 and a first hub segment 42 located radially inward of and separate from the first tip segment 32, the first hub segment 42 configured to independently rotate about the leading edge pitch axis 39 relative to the first tip segment 32.

The method can further include coupling a first actuation head 76 to the first tip segment 32 and coupling a first actuation arm 74 to the first actuation head 76, coupling a second actuation head 86 to the first hub segment 42 and coupling a second actuation arm 84 to the second actuation head 86, rotating the first actuation arm 74 so as to cause rotation of the first actuation head 76 so as to cause rotation of first tip segment 32 so as to selectively rotate the first tip segment 32 about the leading edge pitch axis 39 to a first pitch angle relative to the incoming fan exit air 15, and rotating the second actuation arm 84 so as to cause rotation of the second actuation head 86 so as to cause rotation of first hub segment 42 so as to selectively rotate the first hub segment 42 independent of the first tip segment 32 about the leading edge pitch axis 39 to a second pitch angle relative to the incoming fan exit air 15.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected. Moreover, each of the embodiments described herein, including the specific features and characteristics of each embodiment, may be combined with other embodiments as would be understood by one of ordinary skill in the art.

What is claimed is:

1. A fan assembly for a gas turbine engine, the fan assembly comprising a fan duct arranged circumferentially around a central axis, a fan comprising a plurality of fan blades that extend radially outward relative to the central axis and that are adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane that extends radially relative to the central axis and includes a leading edge portion and a fixed aft portion defining a trailing edge of the first variable leading edge outlet guide vane, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly arranged radially outward of the leading edge portion and including a first actuation head coupled to the first tip segment and a first actuation arm coupled to the first actuation head, wherein rotation of the first actuation arm causes rotation of the first actuation head which causes rotation of the first tip segment so as to selectively rotate the first tip segment about the leading edge pitch axis to a first pitch angle relative to the incoming fan exit air, and a second actuation assembly arranged radially inward of the leading edge portion and including a second actuation head coupled to the first hub segment and a second actuation arm coupled to the second actuation head, wherein rotation of the second actuation arm causes rotation of the second actuation head which causes rotation of the first hub segment so as to selectively rotate the first hub segment independent of the first tip segment about the leading edge pitch axis to a second pitch angle relative to the incoming fan exit air.

2. The fan assembly of claim 1, wherein the first actuation assembly is configured to rotate the first tip segment to the first pitch angle and the second actuation assembly is configured to rotate the first hub segment to the second pitch angle which is different than the first pitch angle.

3. The fan assembly of claim 2, wherein the first hub segment includes a hinge rod extending radially outwardly from a radially outer side of the first hub segment and the first tip segment includes a hinge rod receiving cavity configured to securely receive the hinge rod.

4. The fan assembly of claim 3, wherein the hinge rod of the first hub segment and the hinge rod receiving cavity of the first tip segment are each cylindrical and aligned with the leading edge pitch axis.

5. The fan assembly of claim 1, wherein the first actuation head is coupled to a radially outer side of the first tip segment and is aligned with the leading edge pitch axis such that rotation of the first actuation head rotates the first tip segment about the leading edge pitch axis, and wherein the second actuation head is coupled to a radially inner side of the first hub segment and is aligned with the leading edge pitch axis such that rotation of the second actuation head rotates the first hub segment about the leading edge pitch axis.

6. The fan assembly of claim 5, wherein the first actuation arm is fixedly coupled to the first actuation head at a first end of the first actuation arm and extends axially away from the first actuation head, wherein a second end of the first actuation arm opposite the first end is configured to be moved generally circumferentially relative to the first actuation head such that the first actuation arm is configured to be pivoted about the leading edge pitch axis along with the first actuation head, and wherein the second actuation arm is fixedly coupled to the second actuation head at a first end of the second actuation arm and extends axially away from the second actuation head, wherein a second end of the second actuation arm opposite the first end is configured to be moved generally circumferentially relative to the second actuation head such that the second actuation arm is configured to be pivoted about the leading edge pitch axis along with the second actuation head.

7. The fan assembly of claim 6, wherein the outlet guide vane assembly further includes:

a first annular ring extending circumferentially about the central axis, and a second annular ring arranged radially inward of the first annular ring and extending circumferentially about the central axis, wherein the second end of the first actuation arm is connected to the first annular ring, wherein the second end of the second actuation arm is connected to the second annular ring, and wherein circumferential movement of the first and second annular rings causes movement of the first and second actuation arms generally circumferentially relative to the first and second actuation heads, respectively.

8. The fan assembly of claim 7, wherein the outlet guide vane assembly further includes a plurality of variable leading edge outlet guide vanes that include the first variable leading edge outlet guide vane, each variable leading edge outlet guide vane of the plurality of variable leading edge outlet guide vanes including a respective tip segment and hub segment, and wherein the tip and hub segment of each variable leading edge outlet guide vane of the plurality of variable leading edge outlet guide vanes is connected to the first and second annular rings via a respective actuation arm, respectively, such that movement of the first and second annular rings causes movement of the respective actuation arms generally circumferentially which causes the respective actuation arms to pivot about rotation axes of the respective actuation heads such that the tip and hub segments of each variable leading edge outlet guide vane of the plurality of variable leading edge outlet guide vanes are rotated about respective leading edge axes.

9. The fan assembly of claim 6, wherein the outlet guide vane assembly further includes:

a first annular ring segment extending partially circumferentially about the central axis, and a second annular ring segment arranged radially inward of the first annular ring segment and extending partially circumferentially about the central axis, wherein the second end of the first actuation arm is connected to the first annular ring segment, wherein the second end of the second actuation arm is connected to the second annular ring segment, and wherein circumferential movement of the first and second annular ring segments causes movement of the first and second actuation arms generally circumferentially relative to the first and second actuation heads, respectively.

10. The fan assembly of claim 9, wherein the outlet guide vane assembly further includes:

a third annular ring segment radially aligned with the first annular ring segment, extending partially circumferentially about the central axis, and circumferentially offset from the first annular ring segment, and a fourth annular ring segment radially aligned with the second annular ring segment, arranged radially inward of the first and second annular ring segments, extending partially circumferentially about the central axis, and circumferentially offset from the second annular ring segment, wherein the outlet guide vane assembly further includes a plurality of variable leading edge outlet guide vanes that include the first variable leading edge outlet guide vane, each variable leading edge outlet guide vane of the plurality of variable leading edge outlet guide vanes including a respective tip segment and hub segment, wherein a first group of the tip and hub segments of the variable leading edge outlet guide vanes are connected to the first and second annular ring segments via a respective actuation arm, respectively, wherein a second group of the tip and hub segments of the variable leading edge outlet guide vanes different from the first group are connected to the third and fourth annular ring segments via a respective actuation arm, respectively, wherein movement of the first and second annular ring segments causes movement of the respective actuation arms of the first group of tip and hub segments generally circumferentially such that the first group of tip and hub segments of each of the variable leading edge outlet guide vanes are rotated about respective leading edge axes, and wherein movement of the third and fourth annular ring segments causes movement of the respective actuation arms of the second group of tip and hub segments generally circumferentially which causes the respective actuation arms to pivot about rotation axes of the respective actuation heads such that the second group of tip and hub segments of each of the variable leading edge outlet guide vanes are rotated about respective leading edge axes.

11. The fan assembly of claim 1, wherein the first variable leading edge outlet guide vane further includes a central portion arranged between the first tip segment and the first hub segment such that the first tip segment and the first hub segment are radially spaced apart.

12. The fan assembly of claim 11, wherein the central portion is coupled to and extends axially away from an axially forward side of the fixed aft portion.

13. A fan assembly for a gas turbine engine, the fan assembly comprising a fan duct arranged circumferentially around a central axis, a fan adapted to rotate about the central axis to force fan exit air toward an aft end of the fan duct, and an outlet guide vane assembly located in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane including a leading edge portion and a fixed aft portion defining a trailing edge of the first variable leading edge outlet guide vane, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, a first actuation assembly arranged radially outward of the leading edge portion and configured to selectively rotate the first tip segment about the leading edge pitch axis to a first pitch angle relative to the incoming fan exit air, and a second actuation assembly arranged radially inward of the leading edge portion and configured to selectively rotate the first hub segment independent of the first tip segment about the leading edge pitch axis to a second pitch angle relative to the incoming fan exit air.

14. The fan assembly of claim 13, wherein the first pitch angle is different than the second pitch angle.

15. The fan assembly of claim 14, wherein the first hub segment includes a hinge rod extending radially outwardly from a radially outer side of the first hub segment and the first tip segment includes a hinge rod receiving cavity configured to securely receive the hinge rod.

16. The fan assembly of claim 15, wherein the hinge rod of the first hub segment and the hinge rod receiving cavity of the first tip segment are each cylindrical and aligned with the leading edge pitch axis.

17. The fan assembly of claim 13, wherein the first actuation assembly includes a first actuation head coupled to the first tip segment and a first actuation arm coupled to the first actuation head, wherein rotation of the first actuation arm causes rotation of the first actuation head which causes rotation of the first tip segment, wherein the second actuation assembly includes a second actuation head coupled to the first hub segment and a second actuation arm coupled to the second actuation head, and wherein rotation of the second actuation arm causes rotation of the second actuation head which causes rotation of the first hub segment.

18. The fan assembly of claim 17, wherein the first actuation head is coupled to a radially outer side of the first tip segment and is aligned with the leading edge pitch axis such that rotation of the first actuation head rotates the first tip segment about the leading edge pitch axis, and wherein the second actuation head is coupled to a radially inner side of the first hub segment and is aligned with the leading edge pitch axis such that rotation of the second actuation head rotates the first hub segment about the leading edge pitch axis.

19. The fan assembly of claim 18, wherein the first actuation arm is fixedly coupled to the first actuation head at a first end of the first actuation arm and extends axially away from the first actuation head, wherein a second end of the first actuation arm opposite the first end is configured to be moved generally circumferentially relative to the first actuation head such that the first actuation arm is configured to be pivoted about the leading edge pitch axis along with the first actuation head, and wherein the second actuation arm is fixedly coupled to the second actuation head at a first end of the second actuation arm and extends axially away from the second actuation head, wherein a second end of the second actuation arm opposite the first end is configured to be moved generally circumferentially relative to the second actuation head such that the second actuation arm is configured to be pivoted about the leading edge pitch axis along with the second actuation head.

20. A method comprising arranging a fan duct circumferentially around a central axis, providing a fan comprising a plurality of fan blades that extend radially outward relative to the central axis and that are adapted to rotate about the central axis to force fan exit air toward an aft end of the fan duct, arranging an outlet guide vane assembly in the fan duct axially downstream of the fan and configured to adjust a direction of incoming fan exit air received from the plurality of fan blades and reduce incidence between the outlet guide vane assembly and the fan exit air, the outlet guide vane assembly including a first variable leading edge outlet guide vane, a first actuation assembly arranged radially outward of a leading edge portion of the first variable leading edge outlet guide vane, and a second actuation assembly arranged radially inward of the leading edge portion, the first variable leading edge outlet guide vane extending radially relative to the central axis and including the leading edge portion and a fixed aft portion defining a trailing edge of the first variable leading edge outlet guide vane, the leading edge portion including a first tip segment configured to rotate about a leading edge pitch axis and a first hub segment located radially inward of and separate from the first tip segment, the first hub segment configured to independently rotate about the leading edge pitch axis relative to the first tip segment, coupling a first actuation head to the first tip segment and coupling a first actuation arm to the first actuation head, coupling a second actuation head to the first hub segment and coupling a second actuation arm to the second actuation head, rotating the first actuation arm so as to cause rotation of the first actuation head so as to cause rotation of the first tip segment so as to selectively rotate the first tip segment about the leading edge pitch axis to a first pitch angle relative to the incoming fan exit air, and rotating the second actuation arm so as to cause rotation of the second actuation head so as to cause rotation of the first hub segment so as to selectively rotate the first hub segment independent of the first tip segment about the leading edge pitch axis to a second pitch angle relative to the incoming fan exit air.

* * * * *